United States Patent
Yanai et al.

(10) Patent No.: US 8,928,993 B2
(45) Date of Patent: Jan. 6, 2015

(54) ZOOM LENS AND IMAGE PICKUP APPARATUS USING THE SAME

(71) Applicant: Olympus Imaging Corp., Tokyo (JP)

(72) Inventors: Tetsuya Yanai, Tokyo (JP); Mayu Miki, Tokyo (JP); Minoru Ueda, Kanagawa (JP); Koji Nakagawa, Kanagawa (JP); Toyoki Kon, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 85 days.

(21) Appl. No.: 13/755,198

(22) Filed: Jan. 31, 2013

(65) Prior Publication Data

US 2013/0235468 A1    Sep. 12, 2013

(30) Foreign Application Priority Data

Mar. 12, 2012  (JP) .................................. 2012-054810

(51) Int. Cl.
*G02B 15/14* (2006.01)
*G02B 13/00* (2006.01)
*G02B 15/173* (2006.01)

(52) U.S. Cl.
CPC .............. *G02B 15/14* (2013.01); *G02B 13/009* (2013.01); *G02B 15/173* (2013.01)
USPC .......................................... 359/687; 359/683

(58) Field of Classification Search
USPC ........................................ 359/687, 683, 676
See application file for complete search history.

(56) References Cited

U.S. PATENT DOCUMENTS

| | | | | |
|---|---|---|---|---|
| 5,321,552 A | * | 6/1994 | Horiuchi et al. | 359/654 |
| 6,069,743 A | * | 5/2000 | Nagata et al. | 359/687 |
| 6,185,048 B1 | * | 2/2001 | Ishii et al. | 359/687 |
| 6,577,450 B2 | * | 6/2003 | Hamano et al. | 359/687 |
| 2003/0227691 A1 | * | 12/2003 | Saruwatari | 359/687 |
| 2011/0134540 A1 | * | 6/2011 | Kim | 359/687 |

FOREIGN PATENT DOCUMENTS

JP     2009-276794     11/2009

* cited by examiner

*Primary Examiner* — Scott J Sugarman
(74) *Attorney, Agent, or Firm* — Kenyon & Kenyon LLP

(57) ABSTRACT

A zoom lens comprises in order from an object side a first lens unit having a positive refractive power. The first lens unit consist one positive lens. The zoom lens satisfies the following conditional expressions (1) and (2).

$$Fno_{(W)} < 2.7 \quad (1)$$

$$3.1 < f_t/f_w \quad (2)$$

where,
$Fno_{(W)}$ denotes an F-number of the zoom lens at a wide angle end,
$f_t$ denotes a focal length at a telephoto end of the overall zoom lens system, and
$f_w$ denotes a focal length at the wide angle end of the overall zoom lens system.

20 Claims, 16 Drawing Sheets

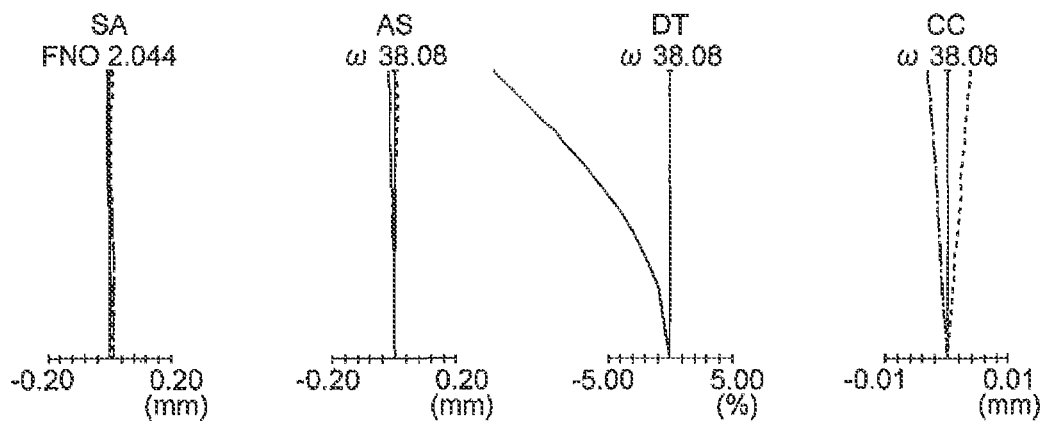
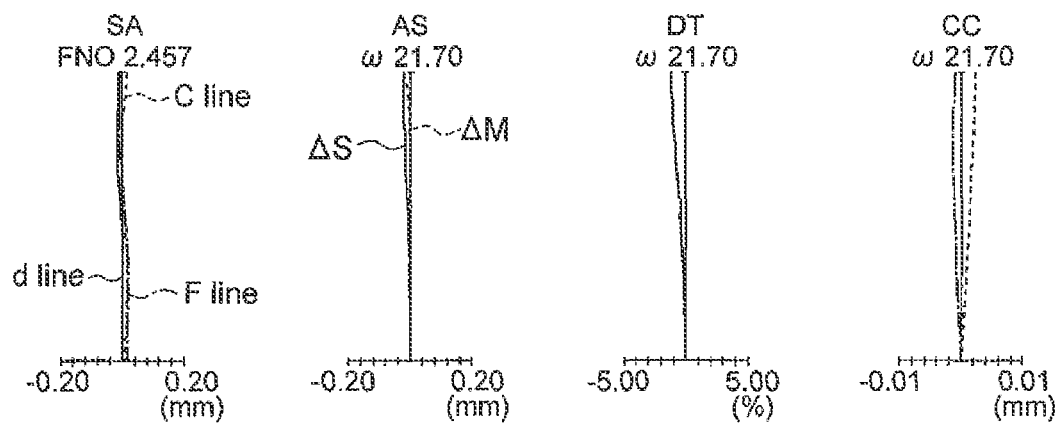
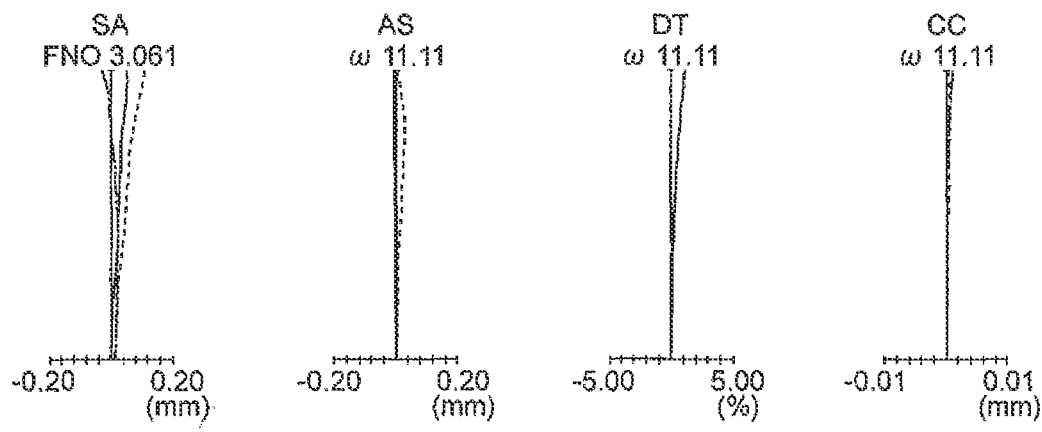

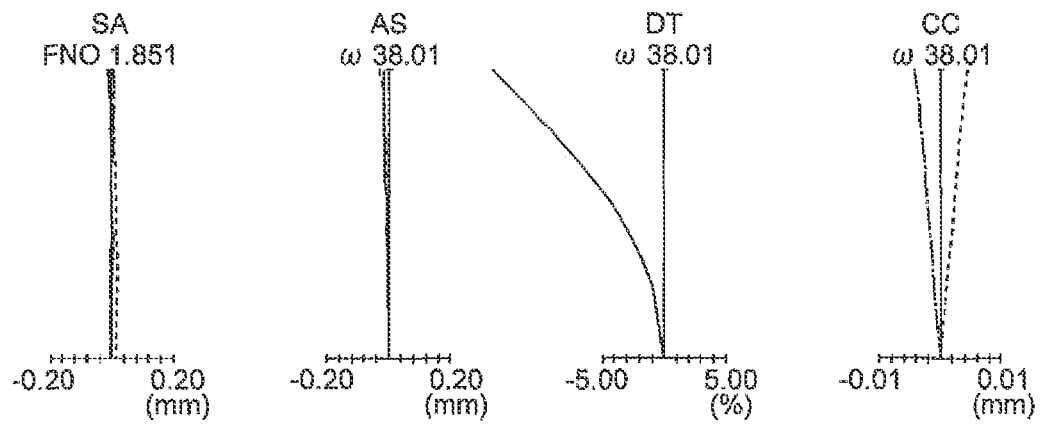
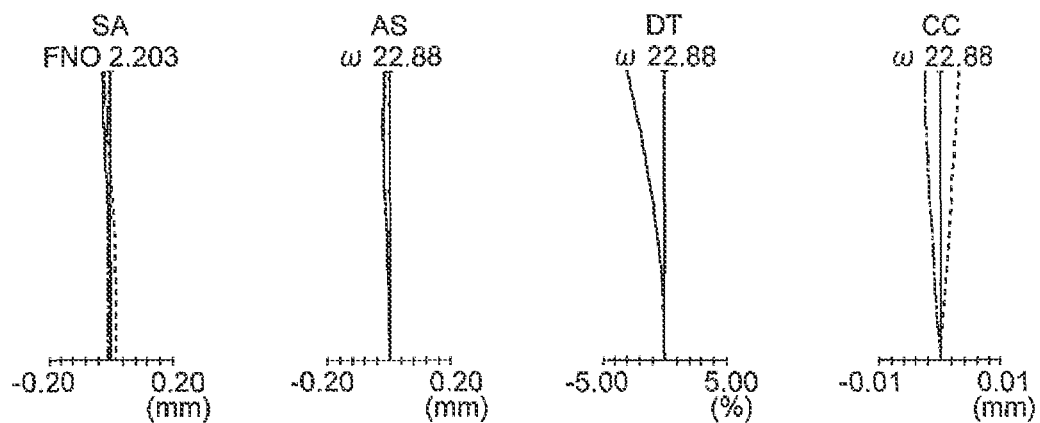
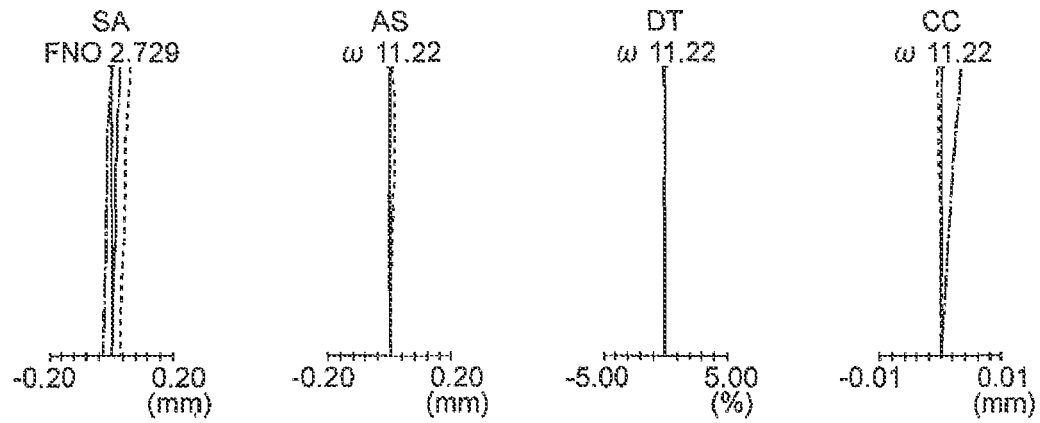

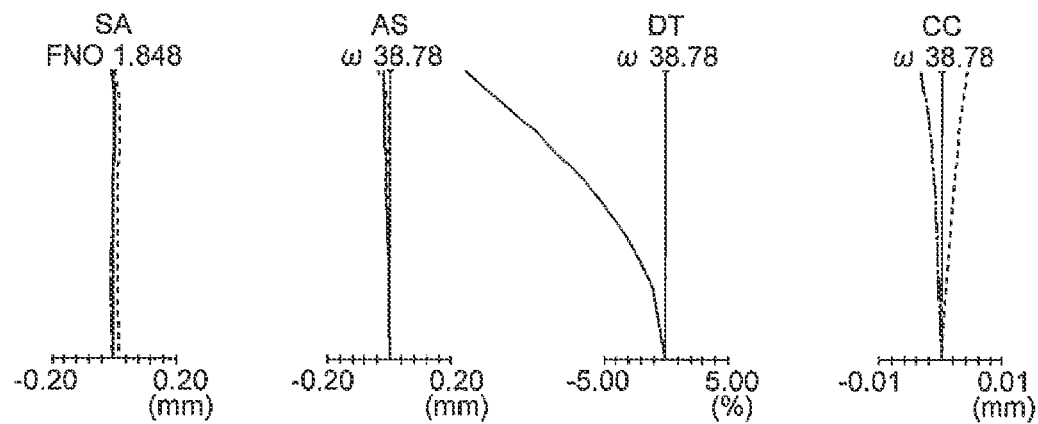
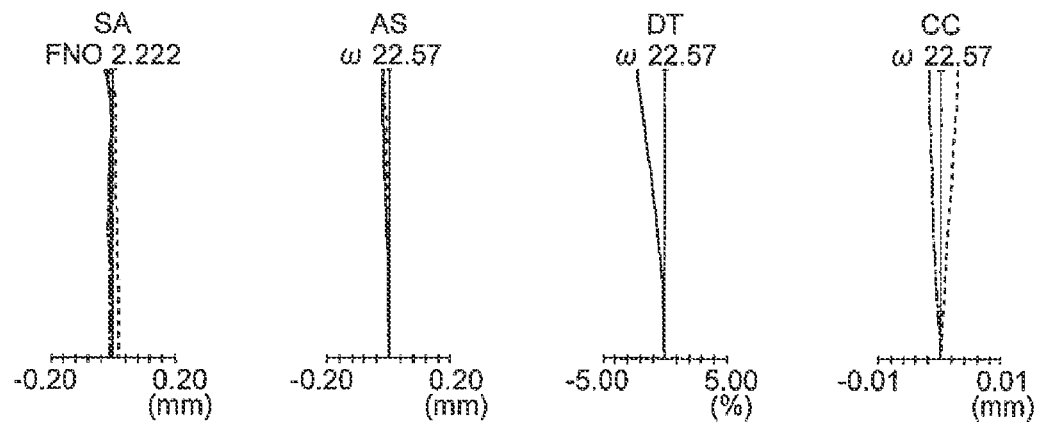
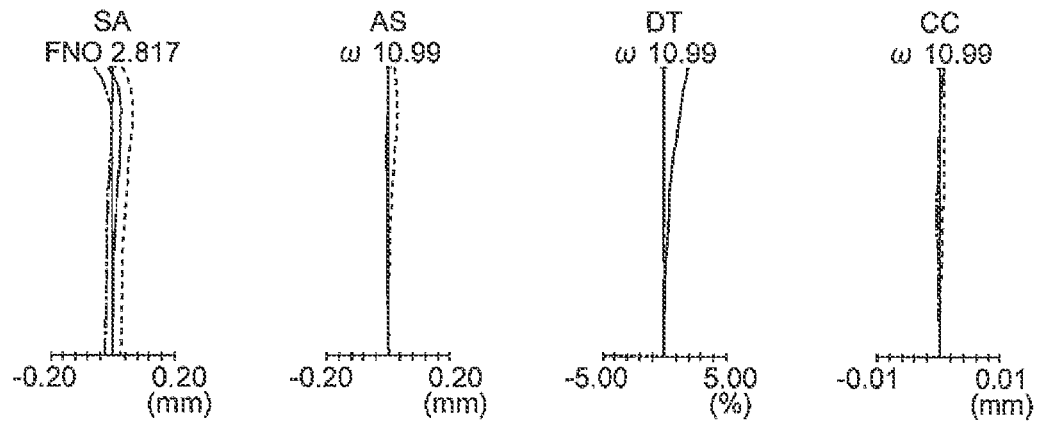

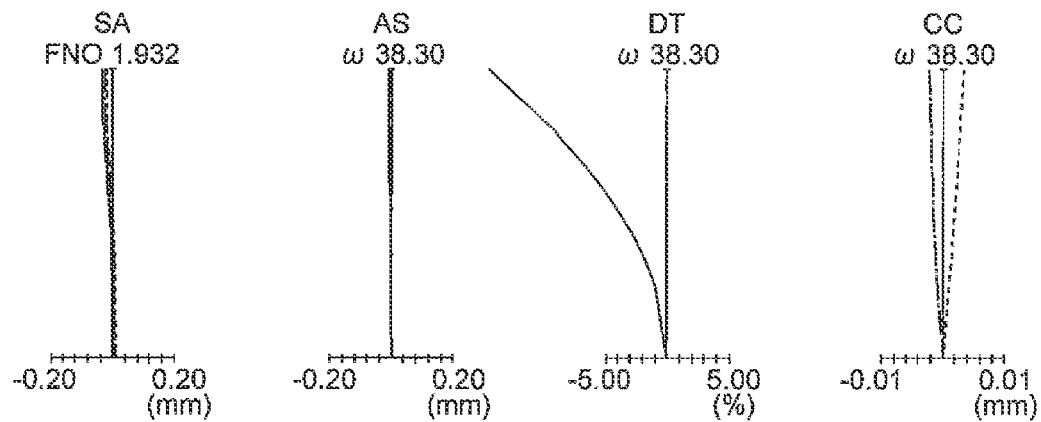
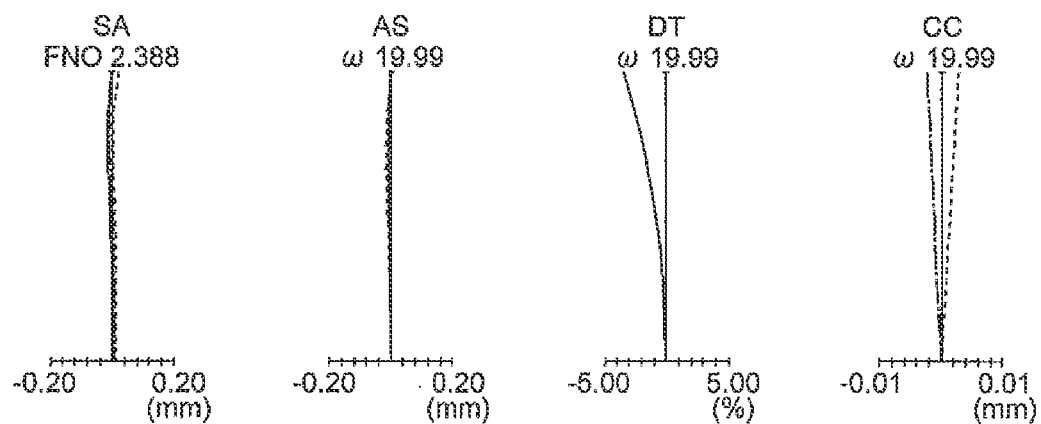
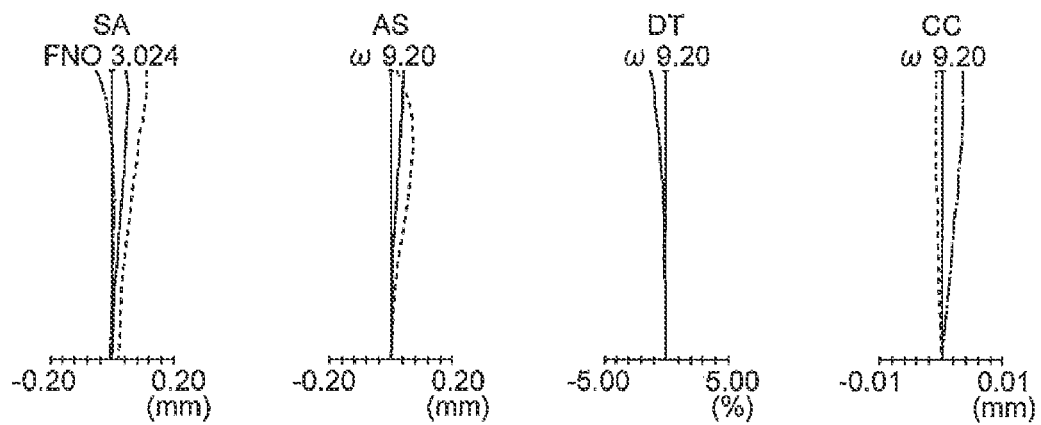

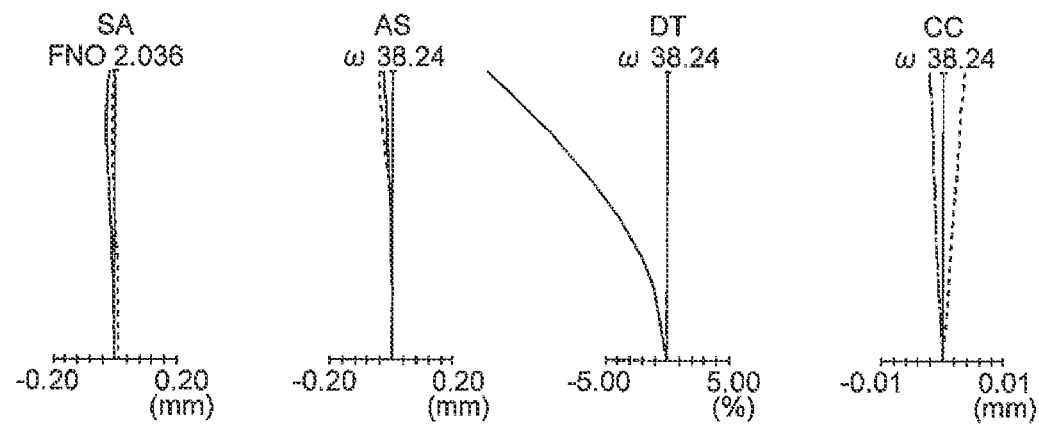
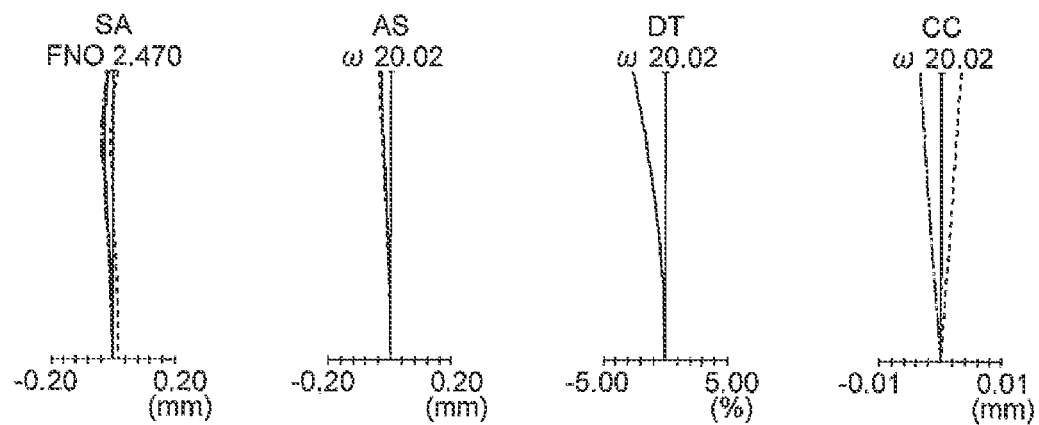
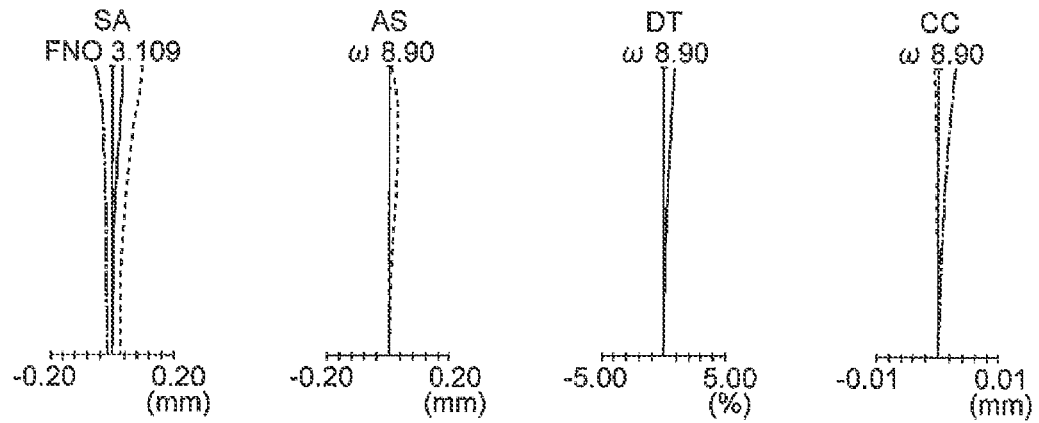

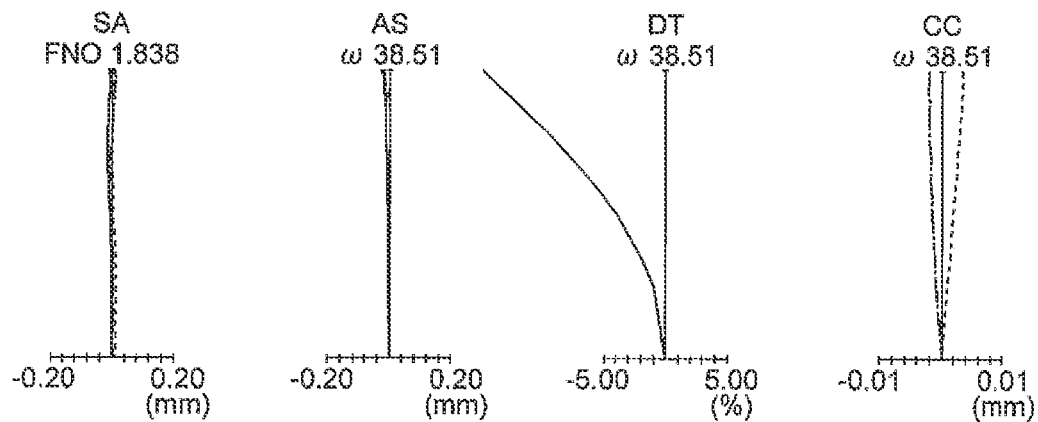
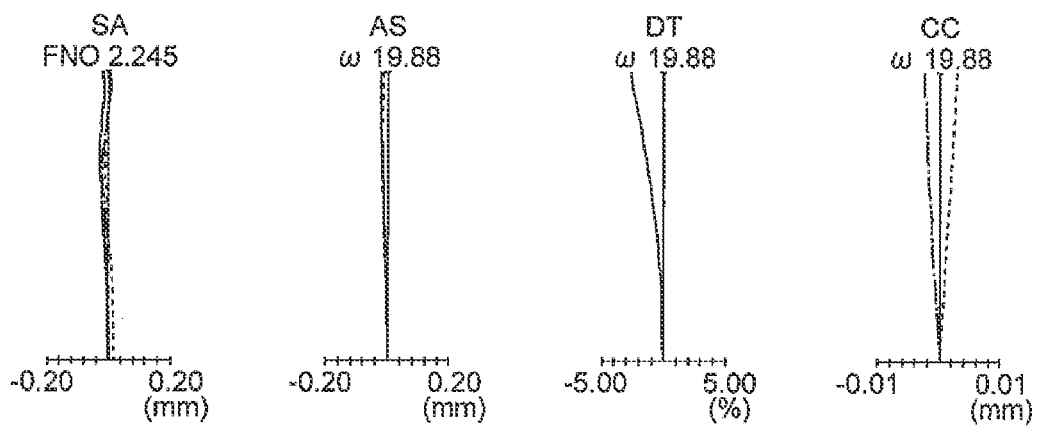
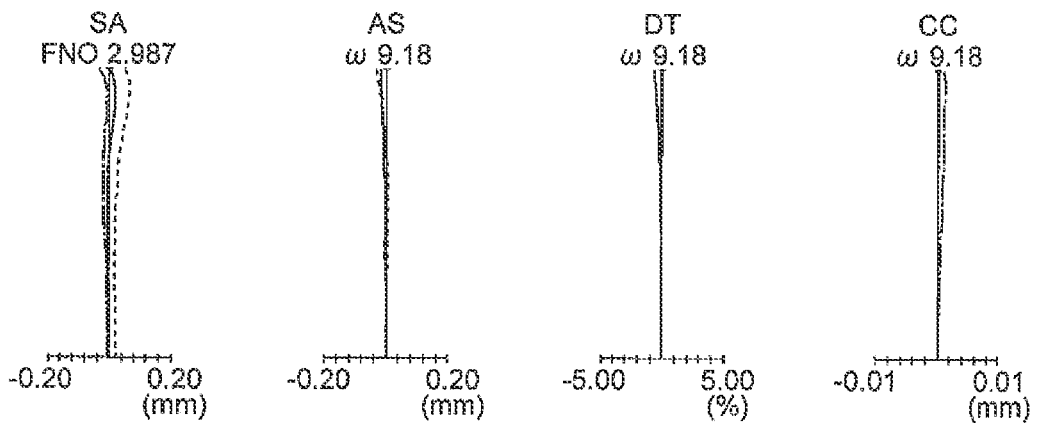

ZOOM LENS AND IMAGE PICKUP APPARATUS USING THE SAME

CROSS-REFERENCE TO RELATED APPLICATION

The present application is based upon and claims the benefit of priority from the prior Japanese Patent Application No. 2012-054810 filed on Mar. 12, 2012; the entire contents of which are incorporated herein by reference.

BACKGROUND OF THE INVENTION

1. Field of the Invention

The present invention relates to a zoom lens and an image pickup apparatus using the same, and in particular, to a zoom lens and an image pickup apparatus which are suitable for a compact digital camera.

2. Description of the Related Art

In recent years, digital cameras in which, an arrangement has been made such that an object is photographed by using a solid image pickup element such as a CCD (Charge Coupled Device) and a CMOS (Complementary Metal Oxide Semiconductor) have become main stream, replacing a silver-salt film camera. Furthermore, such digital cameras have been used in a wide range of categories from a high-function type for professional use to a portable popular type.

A user of such digital camera of the popular type seeks to enjoy photography by capturing readily a wide variety of scenes anytime and anywhere. Therefore, a small-size product, particularly a slim digital camera, which can be accommodated easily in a pocket of clothes or a bag and carried conveniently, has been preferred. Therefore, further small-sizing of a taking lens system has been sought.

Furthermore, in order that capturing can be carried out also in a condition where a level of contrast of lightness is high, a digital camera which carries out image processing such as widening a sensitivity area of dynamic range has also been proposed, and photography in which capture conditions are not to be selected has become possible. In such camera, for photography including photography at dark places, electronic correction of the level of contrast is possible to certain extent, and furthermore, by adopting a fast lens with a large lens aperture, it is also possible to deal with photography even at darker places, and it is possible to widen conditions under which the photography is possible.

In the fast lens with a large aperture, photography with clarity is possible even with a small quantity of incident light. Accordingly, it is possible for a photographer to select a large number of capturing conditions such as increasing a shutter speed in continuous capturing of a moving object, to further higher speed. Therefore, in recent years, a fast lens with a large lens aperture has been drawing attention.

On the other hand, from a point of view of widening of a capture area, the demand for high magnification zoom is still there, and further higher magnification has been anticipated.

As a small-size zoom lens with a comparatively higher zoom ratio and fast aperture, a zoom lens which includes in order from an object side, a first lens unit having one positive lens, a second lens unit having a negative refractive power, a third lens unit having a positive refractive power, and a fourth lens unit having a positive refractive power has been disclosed as a first embodiment in Japanese Patent Application Laid-open Publication No. 2009-276794.

SUMMARY OF THE INVENTION

A zoom lens according to a first aspect of the present invention comprises in order from an object side a first lens unit having a positive refractive power, and the first lens unit consists one positive lens, and the zoom lens satisfies the following conditional expressions (1) and (2).

$$Fno_{(W)} < 2.7 \quad (1)$$

$$3.1 < f_t/f_w \quad (2)$$

where,
$Fno_{(W)}$ denotes an F-number of the zoom lens at a wide angle end,
$f_t$ denotes a focal length at a telephoto end of the overall zoom lens system, and
$f_w$ denotes a focal length at the wide angle end of the overall zoom lens system.

A zoom lens according to a second aspect of the present invention comprises in order from an object side,
a first lens unit having a positive refractive power,
a second lens unit having a negative refractive power,
a third lens unit having a positive refractive power, and
a fourth lens unit having a positive refractive power, and the zoom lens satisfies the following conditional expressions (3), (4), (5), and (6).

$$\Sigma d_{1G}/f_t < 0.13 \quad (3)$$

$$\Sigma d_{1G}/\Sigma d_{3G} < 0.5 \quad (4)$$

$$2.1 < f_3/f_w \quad (5)$$

$$0.2 < L/I \quad (6)$$

where,
$\Sigma d_{1G}$ denotes a sum total of an optical axial thickness of the first lens unit,
$f_t$ denotes a focal length at a telephoto end of the overall zoom lens system,
$\Sigma d_{3G}$ denotes a sum total of an optical axial thickness of the third lens unit,
$f_3$ denotes a focal length of the third lens unit,
$f_w$ denotes a focal length at a wide angle end of the overall zoom lens system,
L denotes an optical axial thickness of optical members which form the first lens unit, and
I denotes a maximum image height at the wide angle end of the overall zoom lens system.

A zoom lens according to a third aspect of the present invention comprises in order from an object side,
a first lens unit having a positive refractive power,
a second lens unit having a negative refractive power,
a third lens unit having a positive refractive power, and
a fourth lens unit having a positive refractive power, and
the first lens unit consists one positive lens, and
the zoom lens satisfies the following conditional expressions (7) and (8).

$$65 < \nu_{d\_1G} \quad (7)$$

$$0.1 < (\beta_{2t}/\beta_{2w})/(\beta_{3t}/\beta_{3w}) < 0.483 \quad (8)$$

where,
$\nu_{d\_1G}$ denotes Abbe's number $(n_{d1}-1)/(n_{F1}-n_{C1})$ for a d-line of the first lens unit,
$n_{d1}$ denotes a refractive index for the d-line of the first lens unit,
$n_{F1}$ denotes a refractive index for an F-line of the first lens unit,
$n_{C1}$ denotes a refractive index for a C-line of the first lens unit,
$\beta_{2t}$ denotes a lateral magnification at a telephoto end of the second lens unit $\beta_{2w}$ denotes a lateral magnification at a wide angle end of the second lens unit, $\beta_{3t}$ denotes a lateral magnification at the telephoto end of the third lens unit, and $\beta_{3w}$ denotes a lateral magnification at the wide angle end of the third lens unit.

A zoom lens according to a fourth aspect of the present invention comprises in order from an object side, a first lens unit having a positive refractive power,
a second lens unit having a negative refractive power,
a third lens unit having a positive refractive power, and
a fourth lens unit having a positive refractive power, and
the first lens unit consists one positive lens, and
the zoom lens satisfies the following conditional expressions (7a) and (8a).

$$71 < \nu_{d\_1G} \tag{7a}$$

$$0.1 < (\beta_{2t}/\beta_{2w})/(\beta_{3t}/\beta_{3w}) < 0.6 \tag{8a}$$

where, $\nu_{d\_1G}$ denotes Abbe's number $(n_{d1}-1)/(n_{F1}-n_{C1})$ for a d-line of the first lens unit, $n_{d1}$ denotes a refractive index for the d-line of the first lens unit, $n_{F1}$ denotes a refractive index for an F-line of the first lens unit, $n_{C1}$ denotes a refractive index for a C-line of the first lens unit, $\beta_{2t}$ denotes a lateral magnification at a telephoto end of the second lens unit $\beta_{2w}$ denotes a lateral magnification at a wide angle end of the second lens unit, $\beta_{3t}$ denotes a lateral magnification at the telephoto end of the third lens unit, and $\beta_{3w}$ denotes a lateral magnification at the wide angle end of the third lens unit.

A zoom lens according to a fifth aspect of the present invention comprises in order from an object side, a first lens unit having a positive refractive power,
a second lens unit having a negative refractive power,
a third lens unit having a positive refractive power, and
a fourth lens unit having a positive refractive power, and
the first lens unit consists one positive lens, and
the zoom lens satisfies the following conditional expressions (7) and (9).

$$65 < \nu_{d\_1G} \tag{7}$$

$$0.05 < (\beta_{4t}/\beta_{4w})/(\beta_{3t}/\beta_{3w}) < 0.27 \tag{9}$$

where, $\nu_{d\_1G}$ denotes Abbe's number $(n_{d1}-1)/(n_{F1}-n_{C1})$ for a d-line of the first lens unit, $n_{d1}$ denotes a refractive index for the d-line of the first lens unit, $n_{F1}$ denotes a refractive index for an F-line of the first lens unit, $n_{C1}$ denotes a refractive index for a C-line of the first lens unit, $\beta_{4t}$ denotes a lateral magnification at a telephoto end of the fourth lens unit $\beta_{4w}$ denotes a lateral magnification at a wide angle end of the fourth lens unit, $\beta_{3t}$ denotes a lateral magnification at the telephoto end of the third lens unit, and $\beta_{3w}$ denotes a lateral magnification at the wide angle end of the third lens unit.

A zoom lens according to a sixth aspect of the present invention comprises in order from an object side, a first lens unit having a positive refractive power,
a second lens unit having a negative refractive power,
a third lens unit having a positive refractive power, and
a fourth lens unit having a positive refractive power, and
the first lens unit consists one positive lens, and
the third lens unit comprises not less than three lenses, and
the zoom lens satisfies the following conditional expressions (7a) and (8b).

$$71 < \nu_{d\_1G} \tag{7a}$$

$$0.1 < (\beta_{2t}/\beta_{2w})/(\beta_{3t}/\beta_{3w}) < 0.65 \tag{8b}$$

where, $\nu_{d\_1G}$ denotes Abbe's number $(n_{d1}-1)/(n_{F1}-n_{C1})$ for a d-line of the first lens unit, $n_{d1}$ denotes a refractive index for the d-line of the first lens unit, $n_{F1}$ denotes a refractive index for an F-line of the first lens unit, $n_{C1}$ denotes a refractive index for a C-line of the first lens unit, $\beta_{2t}$ denotes a lateral magnification at a telephoto end of the second lens unit $\beta_{2w}$ denotes a lateral magnification at a wide angle end of the second lens unit, $\beta_{3t}$ denotes a lateral magnification at the telephoto end of the third lens unit, and $\beta_{3w}$ denotes a lateral magnification at the wide angle end of the third lens unit.

A zoom lens according to a seventh aspect of the present invention comprises in order from an object side, a first lens unit having a positive refractive power,
a second lens unit having a negative refractive power,
a third lens unit having a positive refractive power, and
a fourth lens unit having a positive refractive power, and
the first lens unit consists one positive lens, and the zoom lens satisfies the following conditional expressions (7a), (8C), and (10).

$$71 < \nu_{d\_1G} \tag{7a}$$

$$0.1 < (\beta_{2t}/\beta_{2w})/(\beta_{3t}/\beta_{3w}) < 0.62 \tag{8c}$$

$$0.7 < (\beta_{3t}/\beta_{3w})/(f_t/f_w) < 1.1 \tag{10}$$

where, $\nu_{d\_1G}$ denotes Abbe's number $(n_{d1}-1)/(n_{F1}-n_{C1})$ for a d-line of the first lens unit, $n_{d1}$ denotes a refractive index for the d-line of the first lens unit, $n_{F1}$ denotes a refractive index for an F-line of the first lens unit, $n_{C1}$ denotes a refractive index for a C-line of the first lens unit, $\beta_{2t}$ denotes a lateral magnification at a telephoto end of the second lens unit $\beta_{2w}$ denotes a lateral magnification at a wide angle end of the second lens unit, $\beta_{3t}$ denotes a lateral magnification at the telephoto end of the third lens unit, $\beta_{3w}$ denotes a lateral magnification at the wide angle end of the third lens unit, $f_t$ denotes a focal length at the telephoto end of the overall zoom lens system, and $f_w$ denotes a focal length at the wide angle end of the overall zoom lens system.

A zoom lens according to an eighth aspect of the present invention comprises in order from an object side, a first lens unit having a positive refractive power, a second lens unit having a negative refractive power,
a third lens unit having a positive refractive power, and
a fourth lens unit having a positive refractive power, and
the first lens unit consists one positive lens, and
at the time of zooming from a wide angle end to a telephoto end, the fourth lens unit moves toward the object side, and
the zoom lens satisfies the following conditional expressions (7a), (10), and (11).

$$71 < \nu_{d\_1G} \quad (7a)$$

$$0.7 < (\beta_{3t}/\beta_{3w})/(f_t/f_w) < 1.1 \quad (10)$$

$$0.1 < (\Delta_{1G}/f_1)/(\Delta_{4G}/f_4) < 1.9 \quad (11)$$

where, $\nu_{d\_1G}$ denotes Abbe's number $(n_{d1}-1)/(n_{F1}-n_{C1})$ for a d-line of the first lens unit, $n_{d1}$ denotes a refractive index for the d-line of the first lens unit, $n_{F1}$ denotes a refractive index for an F-line of the first lens unit, $n_{C1}$ denotes a refractive index for a C-line of the first lens unit, $\beta_{3t}$ denotes a lateral magnification at the telephoto end of the third lens unit, $\beta_{3w}$ denotes a lateral magnification at the wide angle end of the third lens unit, $f_t$ denotes a focal length at the telephoto end of the overall zoom lens system, $f_w$ denotes a focal length at the wide angle end of the overall zoom lens system, $f_4$ denotes a focal length of the fourth lens unit, $\Delta_{4G}$ denotes an amount of movement of the fourth lens unit at the telephoto end with respect to the wide angle end, $f_1$ denotes a focal length of the first lens unit, and $\Delta_{1G}$ denotes an amount of movement of the first lens unit at the telephoto end with respect to the wide angle end.

A zoom lens according to a ninth aspect of the present invention comprises in order from an object side,
a first lens unit having a positive refractive power,
a second lens unit having a negative refractive power,
a third lens unit having a positive refractive power, and
a fourth lens unit having a positive refractive power, and
the first lens unit consists one positive lens, and
the zoom lens satisfies the following conditional expressions (7) and (12).

$$65 < \nu_{d\_1G} \quad (7)$$

$$3 < \beta_{3t}/\beta_{3w} \quad (12)$$

where, $\nu_{d\_1G}$ denotes Abbe's number $(n_{d1}-1)/(n_{F1}-n_{C1})$ for a d-line of the first lens unit, $n_{d1}$ denotes a refractive index for the d-line of the first lens unit, $n_{F1}$ denotes a refractive index for an F-line of the first lens unit, $n_{C1}$ denotes a refractive index for a C-line of the first lens unit, $\beta_{3t}$ denotes a lateral magnification at a telephoto end of the third lens unit, and $\beta_{3w}$ denotes a lateral magnification at the wide angle end of the third lens unit.

An image pickup apparatus according to the present invention includes the abovementioned zoom lens, and an image pickup element which is disposed on an image side of the zoom lens, and which includes an image pickup surface which receives an image which has been formed by the zoom lens.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A shows a state at a wide angle end, FIG. 2B shows an intermediate state, and FIG. 2C shows a state at a telephoto end;

FIG. 3A shows a state at a wide angle end, FIG. 3B shows an intermediate state, and FIG. 3C shows a state at a telephoto end;

FIG. 4A shows a state at a wide angle end, FIG. 4B shows an intermediate state, and FIG. 4C shows a state at a telephoto end;

FIG. 5A shows a state at a wide angle end, FIG. 5B shows an intermediate state, and FIG. 5C shows a state at a telephoto end;

FIG. 6A shows a state at a wide angle end, FIG. 6B shows an intermediate state, and FIG. 6C shows a state at a telephoto end;

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L (hereinafter, 'FIG. 7A to FIG. 7L') are aberration diagrams at the time of infinite object point focusing in the first embodiment;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L (hereinafter, 'FIG. 8A to FIG. 8L') are aberration diagrams at the time of infinite object point focusing in the second embodiment;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L (hereinafter, 'FIG. 9A to FIG. 9L') are aberration diagrams at the time of infinite object point focusing in the third embodiment;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L (hereinafter, 'FIG. 10A to FIG. 10L') are aberration diagrams at the time of infinite object point focusing in the fourth embodiment:

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L (hereinafter, 'FIG. 11A to FIG. 11L') are aberration diagrams at the time of infinite object point focusing in the fifth embodiment;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L (hereinafter, 'FIG. 12A to FIG. 12L') are aberration diagrams at the time of infinite object point focusing in the sixth embodiment;

DETAILED DESCRIPTION OF THE INVENTION

Figure 1A:
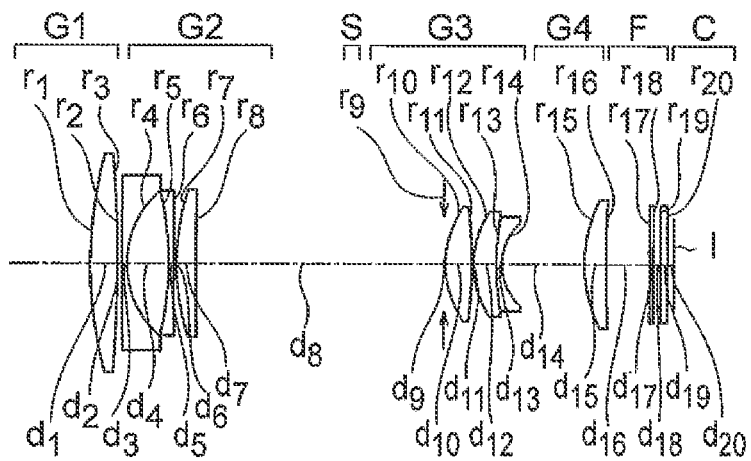
FIG. 1A, FIG. 1B, and FIG. 1C are cross-sectional views along an optical axis showing an arrangement at the time of infinite object point focusing of a zoom lens according to a first embodiment of the present invention, where.

Exemplary embodiments of a zoom lens and an image pickup apparatus using the same according to the present invention will be described below in detail while referring to the accompanying diagrams. However, the present invention is not restricted to the embodiments described below.

To start with, prior to the description of the embodiments, an action and effect of an image pickup optical system according to the present invention will be described below.

A zoom lens according to the embodiments of the present invention comprises in order from an object side a first lens unit having a positive refractive power, and the first lens unit having a positive refractive power consists one positive lens, and the zoom lens satisfies the following conditional expressions (1) and (2).

$$Fno_{(W)} < 2.7 \quad (1)$$

$$3.1 < f_t/f_w \quad (2)$$

where, $Fno_{(W)}$ denotes an F-number of the zoom lens at a wide angle end, $f_t$ denotes a focal length at a telephoto end of the overall zoom lens system, and $f_w$ denotes a focal length at the wide angle end of the overall zoom lens system.

By forming the lens unit nearest to the object side by one positive lens, it is possible to make the lens in the first lens unit slim, and accordingly, it is possible to make small a lens diameter of the first lens unit. Consequently, it is possible to facilitate small-sizing and cost-reduction of the zoom lens.

By the zoom lens satisfying conditional expression (1), it is possible to secure a large aperture diameter and a predetermined brightness at the wide angle end.

Conditional expression (2) is a conditional expression which regulates that the zoom lens is a zoom lens with a high zoom ratio.

A zoom lens according to the embodiments of the present invention comprises in order from an object side, a first lens unit having a positive refractive power,
a second lens unit having a negative refractive power,
a third lens unit having a positive refractive power, and
a fourth lens unit having a positive refractive power, and
the zoom lens satisfies the following conditional expressions (3), (4), (5), and (6).

$$\Sigma d_{1G}/f_t < 0.13 \quad (3)$$

$$\Sigma d_{1G}/\Sigma d_{3G} < 0.5 \quad (4)$$

$$2.1 < f_3/f_w \quad (5)$$

$$0.2 < L/I \quad (6)$$

where, $\Sigma d_{1G}$ denotes a sum total of an optical axial thickness of the first lens unit, $f_t$ denotes a focal length at a telephoto end of the overall zoom lens system, $\Sigma d_{3G}$ denotes a sum total of an optical axial thickness of the third lens unit, $f_3$ denotes a focal length of the third lens unit, $f_w$ denotes a focal length at a wide angle end of the overall zoom lens system, L denotes an optical axial thickness of optical members which form the first lens unit, and I denotes a maximum image height at the wide angle end of the overall zoom lens system.

In such manner, by letting the zoom lens to be a positive-lead type by including in order from the object side, a lens unit having a positive refractive power, a lens unit having a negative refractive power, a lens unit having a positive refractive power, and a lens unit having a positive refractive power, the number of zooming lens units becomes larger than the number of zooming lens units in a negative-lead type zoom lens. Accordingly, the following effects (A-1) and (A-2) are shown.

(A-1) Since a load on the zooming units from the second lens unit onward is reduced, it is possible to make small a fluctuation in an F-number. Consequently, it is possible to make a zoom lens to be a fast zoom lens up to the telephoto end.

(A-2) Since a load on the zooming units from the second lens unit onward is reduced when the high zooming is achieved, it is possible to suppress a fluctuation in aberration. Consequently, it is possible to make the zoom lens to be a zoom lens having a high zooming and aberration performance.

Conditional expression (3) is a conditional expression which regulates a relation of the sum total of the optical axial thickness of the first lens unit and the focal length at the telephoto end of the overall zoom lens system.

When an upper limit of conditional expression (3) is surpassed or exceeded, since the first lens unit becomes thick, a lens diameter of the first lens unit becomes large.

Conditional expression (4) is a conditional expression which regulates a balance of the sum total of the optical axial thickness of the first lens unit and the sum total of the optical axial thickness of the third lens unit.

By making long an overall length of the third lens unit, it is possible to suppress an occurrence of a spherical aberration and a coma aberration.

When an upper limit of conditional expression (4) is surpassed, since the first lens unit becomes thick, the lens diameter of the first lens unit becomes large. Moreover, when the sum total of the thickness of the third lens unit becomes small, in an attempt to maintain a refractive power, the aberration which occurs becomes substantial.

Conditional expression (5) is a conditional expression which regulates a relation of the focal length of the third lens unit and the focal length at the telephoto end of the overall zoom lens system.

When a lower limit of conditional expression (5) is not reached, since the refractive power of the third lens unit becomes large, a spherical correction and the coma aberration become large.

Conditional expression (6) is a conditional expression which regulates a relation of the optical axial thickness of the optical member which forms the first lens unit and a maximum image height at the wide angle end of the overall zoom lens system.

A zoom lens according to the embodiments of the present invention comprises in order from an object side,
a first lens unit having a positive refractive power,
a second lens unit having a negative refractive power,
a third lens unit having a positive refractive power, and
a fourth lens unit having a positive refractive power, and
the first lens unit consists one positive lens, and
the zoom lens satisfies the following conditional expressions (7) and (8).

$$65 < \nu_{d\_1G} \quad (7)$$

$$0.1 < (\beta_{2t}/\beta_{2w})/(\beta_{3t}/\beta_{3w}) < 0.483 \quad (8)$$

where,
$\nu_{d\_1G}$ denotes Abbe's number $(n_{d1}-1)/(n_{F1}-n_{C1})$ for a d-line of the first lens unit,
$n_{d1}$ denotes a refractive index for the d-line of the first lens unit,
$n_{F1}$ denotes a refractive index for an F-line of the first lens unit,
$n_{C1}$ denotes a refractive index for a C-line of the first lens unit,
$\beta_{2t}$ denotes a lateral magnification at a telephoto end of the second lens unit
$\beta_{2w}$ denotes a lateral magnification at a wide angle end of the second lens unit,
$\beta_{3t}$ denotes a lateral magnification at the telephoto end of the third lens unit, and
$\beta_{3w}$ denotes a lateral magnification at the wide angle end of the third lens unit.

In such manner, by letting the zoom lens to be a positive-lead type by including in order from the object side, a lens unit having a positive refractive power, a lens unit having a negative refractive power, a lens unit having a positive refractive power, and a lens unit having a positive refractive power, the number of zooming lens units becomes large than the number of zooming lens units in a negative-lead type zoom lens. Accordingly, the abovementioned effects (A-1) and (A-2) are shown.

When the lens unit having a positive refractive power, the lens unit having a negative refractive power, the lens unit having a positive refractive power, and the lens unit having a positive refractive power are arranged in order from the object side, for making the arrangement bright (fast) and compact, it is preferable that the first lens unit is let to include one lens, and the zoom lens satisfies conditional expressions (7) and (8).

Conditional expression (7) is a conditional expression in which, Abbe's number for the d-line of the first lens unit is regulated.

When a lower limit of conditional expression (7) is not reached, an occurrence of a chromatic aberration becomes substantial.

Conditional expression (7) is a conditional expression which regulates a relation of the lateral magnification at the telephoto end and the lateral magnification at the wide angle end of the second lens unit, and the lateral magnification at the telephoto end and the lateral magnification at the wide angle end of the third lens unit.

When an upper limit of conditional expression (8) is surpassed, a load of zooming on the second lens unit becomes large. Therefore, aberrations such as a curvature of field and a chromatic aberration of magnification at the wide angle end become large. Whereas, since it is necessary to increase the number of lenses for suppressing aberration, small-sizing becomes difficult.

When a lower limit of conditional expression (8) is not reached, a load of zooming on the third lens unit becomes excessively large. Consequently, aberrations such as the spherical aberration and the coma aberration become substantial, and a fluctuation in a longitudinal chromatic aberration becomes large.

A zoom lens according to the embodiments of the present invention comprises in order from an object side,
a first lens unit having a positive refractive power,
a second lens unit having a negative refractive power,
a third lens unit having a positive refractive power, and
a fourth lens unit having a positive refractive power, and
the first lens unit consists one positive lens, and
the zoom lens satisfies the following conditional expressions (7a) and (8a).

$$71 < \nu_{d\_1G} \quad (7a)$$

$$0.1 < (\beta_{2t}/\beta_{2w})/(\beta_{3t}/\beta_{3w}) < 0.6 \quad (8a)$$

where,
$\nu_{d\_1G}$ denotes Abbe's number $(n_{d1}-1)/(n_{F1}-n_{C1})$ for a d-line of the first lens unit,
$n_{d1}$ denotes a refractive index for the d-line of the first lens unit,
$n_{F1}$ denotes a refractive index for an F-line of the first lens unit,
$n_{C1}$ denotes a refractive index for a C-line of the first lens unit,
$\beta_{2t}$ denotes a lateral magnification at a telephoto end of the second lens unit
$\beta_{2w}$ denotes a lateral magnification at a wide angle end of the second lens unit,
$\beta_{3t}$ denotes a lateral magnification at the telephoto end of the third lens unit, and
$\beta_{3w}$ denotes a lateral magnification at the wide angle end of the third lens unit.

Conditional expression (7a) is a conditional expression which regulates Abbe's number for the d-line of the first lens unit. When a lower limit of conditional expression (7a) is not reached, the chromatic aberration becomes substantial.

Conditional expression (8a) is a conditional expression which regulates a relation of the lateral magnification at the telephoto end and the lateral magnification at the wide angle end of the second lens unit and the lateral magnification at the telephoto end and the lateral magnification at the wide angle end of the third lens unit.

When an upper limit of conditional expression (8a) is surpassed, since a load of zooming on the second lens unit becomes large, aberrations such as the curvature of field and the chromatic aberration of magnification become substantial. Whereas, for suppressing the aberration, since it is necessary to increase the number of lenses, small-sizing becomes difficult.

When a lower limit of conditional expression (8a) is not reached, since a load of zooming on the third lens unit becomes excessively large, aberrations such as the spherical aberration and the coma aberration become substantial, and the fluctuation in the chromatic aberration of magnification becomes large.

A zoom lens according to the embodiments of the present invention comprises in order from an object side,
a first lens unit having a positive refractive power,
a second lens unit having a negative refractive power,
a third lens unit having a positive refractive power, and a fourth lens unit having a positive refractive power, and
the first lens unit consists one positive lens, and
the zoom lens satisfies the following conditional expressions (7) and (9).

$$65 < v_{d\_1G} \quad (7)$$

$$0.05 < (\beta_{4t}/\beta_{4w})/(\beta_{3t}/\beta_{3w}) < 0.27 \quad (9)$$

where, $v_{d\_1G}$ denotes Abbe's number $(n_{d1}-1)/(n_{F1}-n_{C1})$ for a d-line of the first lens unit, $n_{d1}$ denotes a refractive index for the d-line of the first lens unit, $n_{F1}$ denotes a refractive index for an F-line of the first lens unit, $n_{C1}$ denotes a refractive index for a C-line of the first lens unit, $\beta_{4t}$ denotes a lateral magnification at a telephoto end of the fourth lens unit $\beta_{4w}$ denotes a lateral magnification at a wide angle end of the fourth lens unit, $\beta_{3t}$ denotes a lateral magnification at the telephoto end of the third lens unit, and $\beta_{3w}$ denotes a lateral magnification at the wide angle end of the third lens unit.

Conditional expression (7) is a conditional expression which regulates Abbe's number for the d-line of the first lens unit.

When a lower limit of conditional expression (7) is not reached, the chromatic aberration of magnification becomes substantial.

Conditional expression (9) is a conditional expression which regulates a balance of zoom ratio of the third lens unit and the fourth lens unit.

When an upper limit of conditional expression (9) is surpassed, as a function (role) of the fourth lens unit as a compensator becomes small, the overall length of the zoom lens becomes long.

When a lower limit of conditional expression (9) is not reached, a load of zooming on the third lens unit becomes excessively large. Therefore, aberrations such as the spherical aberration and the coma aberration become substantial, and a fluctuation in the longitudinal chromatic aberration becomes large.

A zoom lens according to the embodiments of the present invention comprises in order from an object side,
a first lens unit having a positive refractive power,
a second lens unit having a negative refractive power,
a third lens unit having a positive refractive power, and
a fourth lens unit having a positive refractive power, and
the first lens unit consists one positive lens, and
the third lens unit comprises not less than three lenses, and
the zoom lens satisfies the following conditional expressions (7a) and (8b).

$$71 < v_{d\_1G} \quad (7a)$$

$$0.1 < (\beta_{2t}/\beta_{2w})/(\beta_{3t}/\beta_{3w}) < 0.65 \quad (8b)$$

where, $v_{d\_1G}$ denotes Abbe's number $(n_{d1}-1)/(n_{F1}-n_{C1})$ for a d-line of the first lens unit, $n_{d1}$ denotes a refractive index for the d-line of the first lens unit, $n_{F1}$ denotes a refractive index for an F-line of the first lens unit, $n_{C1}$ denotes a refractive index for a C-line of the first lens unit, $\beta_{2t}$ denotes a lateral magnification at a telephoto end of the second lens unit $\beta_{2w}$ denotes a lateral magnification at a wide angle end of the second lens unit, $\beta_{3t}$ denotes a lateral magnification at the telephoto end of the third lens unit, and $\beta_{3w}$ denotes a lateral magnification at the wide angle end of the third lens unit.

By letting the third lens unit include not less than three lenses, it is possible to suppress efficiently an occurrence of various aberrations such as the spherical aberration, the coma aberration, and the chromatic aberration.

Conditional expression (7a) is a conditional expression which regulates Abbe's number for the d-line of the first lens unit.

When a lower limit of conditional expression (7a) is not reached, the chromatic aberration of magnification becomes substantial.

Conditional expression (8b) is a conditional expression which regulates a relation of the lateral magnification at the telephoto end and the lateral magnification at the wide angle end of the second lens unit, and the lateral magnification at the telephoto end and the lateral magnification at the wide angle end of the third lens unit. When an upper limit of conditional expression (8b) is surpassed, since a load of zooming on the second lens unit becomes large, aberrations such as the chromatic aberration of magnification and the curvature of field at the wide angle end become substantial. Whereas, although it is necessary to increase the number of lenses for suppressing the aberration, as the number of lenses is increased, small-sizing of the zoom lens becomes difficult.

When a lower limit of conditional expression (8b) is not reached, since a load of zooming on the third lens unit becomes excessively large, aberrations such as the spherical aberration and the coma aberration become substantial, and fluctuation in the longitudinal chromatic aberration becomes large.

A zoom lens according to the embodiments of the present invention comprises in order from an object side,
a first lens unit having a positive refractive power,
a second lens unit having a negative refractive power,
a third lens unit having a positive refractive power, and
a fourth lens unit having a positive refractive power, and
the first lens unit consists one positive lens, and
the zoom lens satisfies the following conditional expressions (7a), (8c), and (10).

$$71 < v_{d\_1G} \quad (7a)$$

$$0.1 < (\beta_{2t}/\beta_{2w})/(\beta_{3t}/\beta_{3w}) < 0.62 \quad (8c)$$

$$0.7 < (\beta_{3t}/\beta_{3w})/(f_t/f_w) < 1.1 \quad (10)$$

where, $v_{d\_1G}$ denotes Abbe's number $(n_{d1}-1)/(n_{F1}-n_{C1})$ for a d-line of the first lens unit, $n_{d1}$ denotes a refractive index for the d-line of the first lens unit, $n_{F1}$ denotes a refractive index for an F-line of the first lens unit, $n_{C1}$ denotes a refractive index for a C-line of the first lens unit, $\beta_{2t}$ denotes a lateral magnification at a telephoto end of the second lens unit $\beta_{2w}$ denotes a lateral magnification at a wide angle end of the second lens unit, $\beta_{3t}$ denotes a lateral magnification at the telephoto end of the third lens unit, $\beta_{3w}$ denotes a lateral magnification at the wide angle end of the third lens unit, $f_t$ denotes a focal length at the telephoto end of the overall zoom lens system, and $f_w$ denotes a focal length at the wide angle end of the overall zoom lens system.

Conditional expression (7a) is a conditional expression which regulates Abbe's number for the d-line of the first lens unit.

When a lower limit of conditional expression (7a) is not reached, the chromatic aberration of magnification becomes substantial.

Conditional expression (8c) is a conditional expression which regulates a relation of the lateral magnification at the telephoto end and the lateral magnification at the wide angle end of the second lens unit, and the lateral magnification at the telephoto end and the lateral magnification at the wide angle end of the third lens unit.

When an upper limit of conditional expression (8c) is surpassed, since a load of zooming on the second lens unit becomes large, aberrations such as the chromatic aberration of magnification and the curvature of field at the wide angle end become substantial. Whereas, although it is necessary to increase the number of lenses for suppressing the aberration, as the number of lenses is increased, small-sizing of the zoom lens becomes difficult.

When a lower limit of conditional expression (8c) is not reached, since a load of zooming on the third lens unit becomes excessively large, aberrations such as the spherical aberration and the coma aberration become substantial, and fluctuation in the longitudinal chromatic aberration becomes large.

Conditional expression (10) is a conditional expression which regulates a ratio of zooming load of the third lens unit.

When an upper limit of conditional expression (10) is surpassed, since the load of zooming on the third lens unit becomes excessively large, the overall length of the zoom lens becomes long, and the spherical aberration and the coma aberration become remarkable.

When a lower limit of conditional expression (10) is not reached, since the load of zooming on the third lens unit becomes small, it is necessary to compensate the zooming by a lens unit other than the third lens unit. Therefore, aberrations such as the chromatic aberration of magnification and the curvature of field become substantial. Moreover, when the total thickness of a lens unit other than the third lens unit is made large for compensating the zooming, small-sizing of the zoom lens becomes difficult.

A zoom lens according to the embodiments of the present invention comprises in order from an object side, a first lens unit having a positive refractive power, a second lens unit having a negative refractive power, a third lens unit having a positive refractive power, and a fourth lens unit having a positive refractive power, and the first lens unit consists one positive lens, and at the time of zooming from a wide angle end to a telephoto end, the fourth lens unit moves toward the object side, and the zoom lens satisfies the following conditional expressions (7a), (10), and (11).

$$71 < \nu_{d\_1G} \tag{7a}$$

$$0.7 < (\beta_{3t}/\beta_{3w})/(f_t/f_w) < 1.1 \tag{10}$$

$$0.1 < (\Delta_{1G}/f_1)/(\Delta_{4G}/f_4) < 1.9 \tag{11}$$

where, $\nu_{d\_1G}$ denotes Abbe's number $(n_{d1}-1)/(n_{F1}-n_{C1})$ for a d-line of the first lens unit, $n_{d1}$ denotes a refractive index for the d-line of the first lens unit, $n_{F1}$ denotes a refractive index for an F-line of the first lens unit, $n_{C1}$ denotes a refractive index for a C-line of the first lens unit, $\beta_{3t}$ denotes a lateral magnification at the telephoto end of the third lens unit, $\beta_{3w}$ denotes a lateral magnification at the wide angle end of the third lens unit, $f_t$ denotes a focal length at the telephoto end of the overall zoom lens system, $f_w$ denotes a focal length at the wide angle end of the overall zoom lens system, $f_4$ denotes a focal length of the fourth lens unit, $\Delta_{4G}$ denotes an amount of movement of the fourth lens unit at the telephoto end with respect to the wide angle end, $f_1$ denotes a focal length of the first lens unit, and $\Delta_{1G}$ denotes an amount of movement of the first lens unit at the telephoto end with respect to the wide angle end.

Conditional expression (7a) is a conditional expression which regulates Abbe's number for the d-line of the first lens unit.

When a lower limit of conditional expression (7a) is not reached, since a load of zooming on the third lens unit becomes excessively large, the overall length of the zoom lens becomes long, and the spherical aberration and the coma aberration become remarkable.

Conditional expression (10) is a conditional expression which regulates a proportion of load of zooming on the third lens unit.

When an upper limit of conditional expression (10) is surpassed, since the load of zooming on the third lens unit becomes excessively large, the overall length of the zoom lens becomes large, and the spherical aberration and the coma aberration become remarkable.

When a lower limit of conditional expression (10) is not reached, since the load of zooming on the third lens unit becomes small, it is necessary to compensate the load of zooming by a lens unit other than the third lens unit. Therefore, aberrations such as the chromatic aberration of magnification and the curvature of field become substantial. Moreover, when a thickness of the lens unit other than the third lens unit is made large for compensating the zooming, small-sizing of the zoom lens becomes difficult.

Conditional expression (11) is a conditional expression which regulates a relation of the focal length of the first lens unit and the focal length of the fourth lens unit, and the amount of movement of the first lens unit at the telephoto end with respect to the wide angle end and the amount of movement of the fourth lens unit at the telephoto end with respect to the wide angle end.

When an upper limit of conditional expression (11) is surpassed, since a function (role) of compensator in the first lens unit (of the first lens unit) becomes excessively substantial (important), the amount of movement of the first lens unit becomes large. Accordingly, the overall length of the zoom lens becomes large and also a fluctuation in the chromatic aberration becomes large.

When a lower limit of conditional expression (11) is not reached, as a function (role) of compensator in the fourth lens unit (of the fourth lens unit) becomes excessively substantial (important), the amount of movement of the fourth lens unit becomes large, and accordingly the fluctuation in the chromatic aberration becomes large.

A zoom lens according to the embodiments of the present invention comprises in order from an object side,
a first lens unit having a positive refractive power,
a second lens unit having a negative refractive power,
a third lens unit having a positive refractive power, and
a fourth lens unit having a positive refractive power, and
the first lens unit consists one positive lens, and
the zoom lens satisfies the following conditional expressions (7) and (12).

$$65 < \nu_{d\_1G} \quad (7)$$

$$3 < \beta_{3t}/\beta_{3w} \quad (12)$$

where, $\nu_{d\_1G}$ denotes Abbe's number $(n_{d1}-1)/(n_{F1}-n_{C1})$ for a d-line of the first lens unit, $n_{d1}$ denotes a refractive index for the d-line of the first lens unit, $n_{F1}$ denotes a refractive index for an F-line of the first lens unit, $n_{C1}$ denotes a refractive index for a C-line of the first lens unit, $\beta_{3t}$ denotes a lateral magnification at a telephoto end of the third lens unit, and $\beta_{3w}$ denotes a lateral magnification at the wide angle end of the third lens unit.

Conditional expression (7) is a conditional expression in which, Abbe's number for the d-line of the first lens has been regulated.

When a lower limit of conditional expression (7) is not reached, the chromatic aberration of magnification becomes substantial.

Conditional expression (12) is a conditional expression which has been regulated for achieving high zooming.

In the zoom lens according to the embodiments, it is preferable that the zoom lens satisfies the following conditional expression (13).

$$Fno_{(T)} < 4.1 \quad (13)$$

where, $Fno_{(T)}$ denotes an F-number of the zoom lens at a telephoto end.

Conditional expression (13) is a conditional expression which has been regulated for securing brightness at the telephoto end.

In the zoom lens according to the embodiments, it is preferable that the zoom lens satisfies the following conditional expression (9).

$$0.05 < (\beta_{4t}/\beta_{4w})/(\beta_{3t}/\beta_{3w}) < 0.27 \quad (9)$$

where, $\beta_{4t}$ denotes a lateral magnification at the telephoto end of the fourth lens unit $\beta_{4w}$ denotes a lateral magnification at the wide angle end of the fourth lens unit, $\beta_{3t}$ denotes a lateral magnification at the telephoto end of the third lens unit, and $\beta_{3w}$ denotes a lateral magnification at the wide angle end of the third lens unit.

Conditional expression (9) is a conditional expression which regulates a balance of zoom ratio of the third lens unit and fourth lens unit for suppressing the overall length of the zoom lens.

When an upper limit of conditional expression (9) is surpassed, since a function (role) of the fourth lens unit as a compensator becomes small, the overall length of the zoom lens becomes large.

When a lower limit of conditional expression (9) is not reached, since a load of zooming on the third lens unit becomes excessively large, aberrations such as the spherical aberration and the coma aberration become large, and a fluctuation in the longitudinal chromatic aberration becomes large.

In the zoom lens according to the embodiments, it is preferable that the zoom lens satisfies the following conditional expression (10).

$$0.7 < (\beta_{3t}/\beta_{3w})/(f_t/f_w) < 1.1 \quad (10)$$

where, $\beta_{3t}$ denotes a lateral magnification at the telephoto end of the third lens unit, $\beta_{3w}$ denotes a lateral magnification at the wide angle end of the third lens unit, $f_t$ denotes the focal length at the telephoto end of the overall zoom lens system, and $f_w$ denotes the focal length at the wide angle end of the overall zoom lens system.

Conditional expression (10) is a conditional expression in which, a proportion of zooming load of the third lens unit is regulated.

When an upper limit of conditional expression (10) is surpassed, since the load of zooming on the third lens unit becomes excessively large, the overall length of the zoom lens becomes long, and the spherical aberration and the coma aberration become remarkable.

When a lower limit of conditional expression (10) is not reached, since the load of zooming on the third lens unit becomes small, it is necessary to compensate zooming by a lens unit other than the third lens unit. Therefore, aberrations such as the chromatic aberration of magnification and the curvature of field become substantial.

In the zoom lens according to the embodiments, it is preferable that at the time of zooming from the wide angle end to the telephoto end, the fourth lens unit moves toward the object side, and
the zoom lens satisfies the following conditional expression (11).

$$0.1 < (\Delta_{1G}/f_1)/(\Delta_{4G}/f_4) < 1.9 \quad (11)$$

where, $f_4$ denotes a focal length of the fourth lens unit, $\Delta_{4G}$ denotes an amount of movement of the fourth lens unit at the telephoto end with respect to the wide angle end, $f_1$ denotes a focal length of the first lens unit, and $\Delta_{1G}$ denotes an amount of movement of the first lens unit at the telephoto end with respect to the wide angle end.

Conditional expression (11) is a conditional expression which regulates relation of the focal length of the first lens unit and the focal length of the fourth lens unit, and the amount of movement of the first lens unit at the telephoto end with respect to the wide angle end and the amount of movement of the fourth lens unit at the telephoto end with respect to the wide angle end.

When an upper limit of conditional expression (11) is surpassed, since a function as a compensator in the (of the) first lens unit becomes excessively large (important), the amount of movement of the first lens unit becomes large. Accordingly, the overall length of the zoom lens becomes large, and a fluctuation in the chromatic aberration becomes large.

When a lower limit of condition expression (11) is not reached, as a function as a compensator in the (of the) fourth lens unit becomes excessively large (important), the amount of movement of the fourth lens unit becomes large, and accordingly, the fluctuation in the chromatic aberration becomes large.

In the zoom lens according to the embodiments of the present invention, it is preferable that the zoom lens satisfies the following conditional expression (14).

$$L_t/f_t < 3.2 \tag{14}$$

where, $L_t$ denotes a total length at the telephoto end of the overall zoom lens system, and $f_t$ denotes the focal length at the telephoto end of the overall zoom lens system.

Conditional expression (14) is a conditional expression in which, a condition for securing a compact arrangement has been regulated. When an upper limit of conditional expression (14) is surpassed, the overall length at the telephoto end of the zoom lens becomes long, and it becomes difficult to secure a compact arrangement (structure).

In the zoom lens according to the embodiments of the present invention, it is preferable that the zoom lens satisfies the following conditional expression (15).

$$\beta_{4(T)} < 0.7 \tag{15}$$

where, $\beta_{4(T)}$ denotes a lateral magnification at the telephoto end of the fourth lens unit.

By the zoom lens satisfying conditional expression (15), by imparting FC sensitivity to the fourth lens unit, it is possible to correct an image position, and to shorten the overall length at the telephoto end.

As an upper limit of conditional expression (15) is surpassed, the FC sensitivity becomes small (low).

In the zoom lens according to the embodiments, it is preferable that at the time of zooming from the wide angle end to the telephoto end, the first lens unit moves.

By moving the first lens unit, since the function of a compensator is carried out by the first lens unit, it is possible to suppress the overall length of the zoom lens.

In the zoom lens according to embodiments, it is preferable that the zoom lens satisfies the following conditional expression (8b).

$$0.1 < (\beta_{2t}/\beta_{2w})/(\beta_{3t}/\beta_{3w}) < 0.65 \tag{8b}$$

where, $\beta_{2t}$ denotes a lateral magnification at a telephoto end of the second lens unit $\beta_{2w}$ denotes a lateral magnification at a wide angle end of the second lens unit, $\beta_{3t}$ denotes a lateral magnification at the telephoto end of the third lens unit, and $\beta_{3w}$ denotes a lateral magnification at the wide angle end of the third lens unit.

Conditional expression (8b) is a conditional expression which regulates the relation between the lateral magnification at the telephoto end and the lateral magnification at the wide angle end of the second lens unit and the lateral magnification at the telephoto end and the lateral magnification at the wide angle end of the third lens unit.

When an upper limit of conditional expression (8b) is surpassed, since the load of zooming on the second lens unit becomes large, aberrations such as the chromatic aberration of magnification and the curvature of field at the wide angle end become substantial. Whereas, although it is necessary to increase the number of lenses for suppressing the aberrations, as the number of lenses is increased, small-sizing of the zoom lens becomes difficult.

When a lower limit of conditional expression (8b) is not reached, since the load of zooming on the third lens unit becomes excessively large, aberrations such as the spherical aberration and the coma aberration become substantial, and fluctuation in the longitudinal chromatic aberration becomes large.

In the zoom lens according to the embodiments, it is preferable that at the time of zooming from the wide angle end to the telephoto end, an aperture stop moves integrally with the third lens unit.

In a case in which, the zoom lens includes in order from the object side, a lens unit having a positive refractive power, a lens unit having a negative refractive power, a lens unit having a positive refractive power, and a lens unit having a negative refractive power, since the number of lens units for zooming is more than the number of lens unit for zooming in a case in which, a lens unit having a negative refractive power is disposed nearest to the object side, it is possible to reduce the load of the lens unit for zooming. Consequently, since it is possible to reduce the load of (on) the third lens unit which is a lens unit for zooming, in a case of moving the aperture integrally with the third lens unit, it is possible to suppress a fluctuation in the F-number.

In the zoom lens according to the embodiments, it is preferable that the zoom lens satisfies the following conditional expression (16).

$$1.5 < f_1/f_t < 4.2 \tag{16}$$

where, $f_1$ denotes a focal length of the first lens unit, and $f_t$ denotes the focal length at the telephoto end of the overall zoom lens system.

Conditional expression (16) is a conditional expression which regulates a relation of the focal length of the first lens unit and the focal length at the telephoto end of the overall lens system.

When a lower limit of conditional expression (16) is not reached, since the refractive power of the first lens unit is strong, the curvature of field and the chromatic aberration at the telephoto end become substantial.

When an upper limit of conditional expression (16) is surpassed, since the refractive power of the first lens unit becomes small, the overall length of the zoom lens becomes long.

Consequently, small-sizing of the zoom lens becomes difficult.

In the zoom lens according to the embodiments of the present invention, it is preferable that the zoom lens satisfies the following conditional expression (17).

$$-1 < f_2/f_3 < -0.6 \tag{17}$$

where, $f_2$ denotes a focal length of the second lens unit, and $f_3$ denotes a focal length of the third lens unit.

Conditional expression (17) is a conditional expression which regulates a relation of the focal length of the second lens unit and the focal length of the third lens unit.

When an upper limit of conditional expression (17) is surpassed, since the refractive power of the second lens unit with respect to the refractive power of the third lens unit becomes strong, the chromatic aberration of magnification and the curvature of field at the wide angle end become substantial.

When a lower limit of conditional expression (17) is not reached, since the refractive power of the third lens unit becomes excessively strong, the spherical aberration and the coma aberration become substantial.

In the zoom lens according to the embodiments, it is preferable that the zoom lens satisfies the following conditional expression (18).

$$0.45 < f_3/f_t < 0.7 \quad (18)$$

where, $f_3$ denotes the focal length of the third lens unit, and $f_t$ denotes the focal length at the telephoto end of the overall zoom lens system.

Conditional expression (18) is a conditional expression which regulates the focal length of the third lens unit and the focal length at the telephoto end of the overall zoom lens unit.

When an upper limit of conditional expression (18) is surpassed, since the refractive power of the third lens unit is weak, the overall length of the zoom lens becomes long, and small-sizing becomes difficult.

When a lower limit of conditional expression (18) is not reached, since the refractive power of the third lens unit becomes excessively strong, the spherical aberration and the coma aberration become substantial.

In the zoom lens according to the embodiments, it is preferable that the zoom lens satisfies the following conditional expression (19).

$$-0.6 < f_2/f_t < -0.3 \quad (19)$$

where, $f_2$ denotes a focal length of the second lens unit, and $f_t$ denotes a focal length at the telephoto end of the overall zoom lens system.

Conditional expression (19) is a conditional expression which regulates a relation of the focal length of the second lens unit and the focal length at the telephoto end of the overall zoom lens system.

When a lower limit of conditional expression (19) is not reached, since the refractive power of the second lens unit becomes weak, the overall length of the zoom lens becomes long, and small-sizing of the zoom lens becomes difficult.

When an upper limit of conditional expression (19) is surpassed, since the refractive power of the second lens unit becomes strong, the chromatic aberration of magnification and the curvature of field at the wide angle end become substantial.

In the zoom lens according to the embodiments, the third lens unit comprises in order from the object side a first lens component having a positive refractive power and a second lens component having a negative refractive power, and the zoom lens satisfies the following conditional expression (20).

$$0.1 < |f_{\_3G1}/f_{\_3G2}| < 0.63 \quad (20)$$

where, $f_{\_3G1}$ denotes a focal length of the first lens component in the third lens unit, and $f_{\_3G2}$ denotes a focal length of the second lens component in the third lens unit.

Conditional expression (20) is a conditional expression which regulates a condition for suppressing an occurrence of the spherical aberration and the coma aberration while the third lens unit has a zoom ratio.

When an upper limit of conditional expression (20) is surpassed, since the refractive power of the second lens component in the third lens unit is strong, the refractive power of the third lens unit as a whole cannot be made strong.

When a lower limit of conditional expression (20) is not reached, since the refractive power of the first lens component in the third lens unit is excessively strong, the spherical aberration and the coma aberration become substantial.

In the zoom lens according to the embodiments, it is preferable that the second lens component is a cemented lens of a positive lens and a negative lens, and the zoom lens satisfies the following conditional expression (21).

$$1.4 < |f_{\_3G2-p}/f_{\_3G2-n}| < 1.9 \quad (21)$$

where, $f_{\_3G2-p}$ denotes a focal length of the positive lens of the second lens component in the third lens unit, and $f_{\_3G2-n}$ denotes a focal length of the negative lens of the second lens component in the third lens unit.

Conditional expression (21) is a conditional expression which regulates a balance of (refractive) power in the third lens unit and (refractive power in) the second lens unit.

When an upper limit of conditional expression (21) is surpassed, since the refractive power of the negative lens is strong, the refractive power of the second lens component becomes strong. Accordingly, the refractive power of the third lens unit as a whole cannot be made strong.

When a lower limit of conditional expression (21) is not reached, the refractive power of the negative lens becomes weak. Therefore, due to principal points of the third lens unit being positioned at a rear side, it becomes disadvantageous for a compact structure (arrangement).

In the zoom lens according to the embodiments, it is preferable that the zoom lens satisfies the following conditional expression (22).

$$-0.05 \leq (n_{d\_3G2-p}) - (n_{d\_3G2-n}) \quad (22)$$

where, $n_{d\_3G2-p}$ denotes a refractive index of the positive lens of the second lens component in the third lens unit, and $n_{d\_3G2-n}$ denotes a refractive index of the negative lens of the second lens component in the third lens unit.

By letting the refractive power of the positive lens and the refractive power of the negative lens of the second lens component in the third lens unit to be balanced satisfactorily, it is possible to make the refractive power of the second lens component weak (small), and to secure the refractive power of the third lens unit.

When a lower limit of conditional expression (22) is not reached, since the refractive power of the second lens unit becomes strong, the refractive power of the third lens unit as a whole cannot be secured.

An image pickup apparatus according to the embodiment includes the abovementioned zoom lens, and an image pickup element which is disposed on an image side of the zoom lens, and which includes an image pickup surface which receives an image which has been formed by the zoom lens.

For conditional expression (1), it is preferable to let an upper limit value to be 2.3, and 2.1 is more preferable.

For conditional expression (2), it is preferable to let an upper limit value to be 10, and 8 is more preferable. Moreover, for conditional expression (2), it is preferable to let a lower limit value to be 3.5, and 4.5 is more preferable.

For conditional expression (3), it is preferable to let an upper limit value to be 0.11.

For conditional expression (4), it is preferable to let an upper limit value to be 0.49.

For conditional expression (5), it is preferable to let an upper limit value to be 10. Moreover, for conditional expression (5), it is preferable to let a lower limit value to be 2.2.

For conditional expression (6), it is preferable to let a lower limit value to be 0.15, and 0.1 is more preferable.

For conditional expression (7), it is preferable to let a lower limit value to be 71, and 80 is more preferable.

For conditional expression (7a), it is preferable to let a lower limit value to be 80.

For conditional expression (8), it is preferable to let a lower limit value to be 0.15.

For conditional expression (8a), it is preferable to let an upper limit value to be 0.5, and 0.483 is more preferable.

For conditional expression (8b), it is preferable to let an upper limit value to be 0.6, and 0.483 is more preferable.

For conditional expression (8c), it is preferable to let an upper limit value to be 0.5, and 0.483 is more preferable.

For conditional expression (9), it is preferable to let a lower limit value to be 0.1.

For conditional expression (10), it is preferable to let an upper limit value to be 0.9. Moreover, for conditional expression (10), it is preferable to let a lower limit value to be 0.8.

For conditional expression (11), it is preferable to let an upper limit value to be 1.5, and 1 is more preferable. Moreover, for conditional expression (11), it is preferable to let a lower limit value to be 0.15, and 0.2 is more preferable.

For conditional expression (12), it is preferable to let an upper limit value to be 8. Moreover, for conditional expression (12), it is preferable to let a lower limit value to be 3.1.

For conditional expression (13), it is preferable to let an upper limit value to be 3.5, and 3.2 is more preferable.

For conditional expression (14), it is preferable to let an upper limit value to be 3, and 2.6 is more preferable.

For conditional expression (15), it is preferable to let an upper limit value to be 0.66.

For conditional expression (16), it is preferable to let an upper limit value to be 3.5. Moreover, for conditional expression (16), it is preferable to let a lower limit value to be 1.6.

For conditional expression (17), it is preferable to let an upper limit value to be −0.65. Moreover, for conditional expression (17), it is preferable to let a lower limit value to be −0.9.

For conditional expression (18), it is preferable to let an upper limit value to be 0.65. Moreover, for conditional expression (18), it is preferable to let a lower limit value to be 0.5.

For conditional expression (19), it is preferable to let an upper limit value to be −0.35. Moreover, for conditional expression (19), it is preferable to let a lower limit value to −0.58.

For conditional expression (20), it is preferable to let a lower limit value to be 0.3.

For conditional expression (21), it is preferable to let a lower limit value to be 1.5.

For conditional expression (22), it is preferable to let a lower limit value to be 0.

Embodiments from a first embodiment to a sixth embodiment of the zoom lens according to the present invention will be described below. Lens cross-sectional views at a wide angle end at the time of infinite object point focusing of the embodiments from the first embodiment to the sixth embodiment are shown in FIG. 1A, FIG. 2A, FIG. 3A, FIG. 4A, FIG. 5A, and FIG. 6A respectively. Lens cross-sectional views in an intermediate focal length state at the time of infinite object point focusing of the embodiments from the first embodiment to the sixth embodiment are shown in FIG. 1B, FIG. 2B, FIG. 3B, FIG. 4B, FIG. 5B, and FIG. 6B respectively. Lens cross-sectional views at a telephoto end at the time of infinite object point focusing of the embodiments from the first embodiment to the sixth embodiment are shown in FIG. 1C, FIG. 2C, FIG. 3C, FIG. 4C, FIG. 5C, and FIG. 6C respectively. In diagrams from FIG. 1A to FIG. 6C, a first lens unit is denoted by G1, a second lens unit is denoted by G2, a third lens unit is denoted by G3, a fourth lens unit is denoted by G4, an aperture stop is denoted by S, a flat and parallel plate which forms a low-pass filter, on which a wavelength-region restricting coating which restricts infra-red rays is applied is denoted by F, a flat and parallel plate of a cover glass of an electronic image pickup element is denoted by C, and an image plane is denoted by I. A multi-layer film for restricting wavelength region may be applied to a surface of the cover glass C. Moreover, an arrangement may be made to impart an effect of a low-pass filter to the cover glass C. An arrangement may be made such that the flat and parallel plate F does not have a function of a low-pass filter.

Moreover, in each of the embodiments, the aperture stop moves integrally with the third lens unit G3. All numerical data is data in a state when focused at an object at an infinite distance.

For numerical data, a unit of length is mm and a unit of angle is ° (degrees). Furthermore, zoom data are values at a wide angle end, in an intermediate focal length state, and at a telephoto end.

In the following embodiments, it is preferable to carry out focusing by moving the fourth lens unit G4, and focusing may be carried out by following (B-1), (B-2), and (B-3) given below.

(B-1) Focusing is to be carried out by a lens unit other than the fourth lens unit.

(B-2) Focusing is to be carried out by moving a plurality of lens units.

Figure 1B:
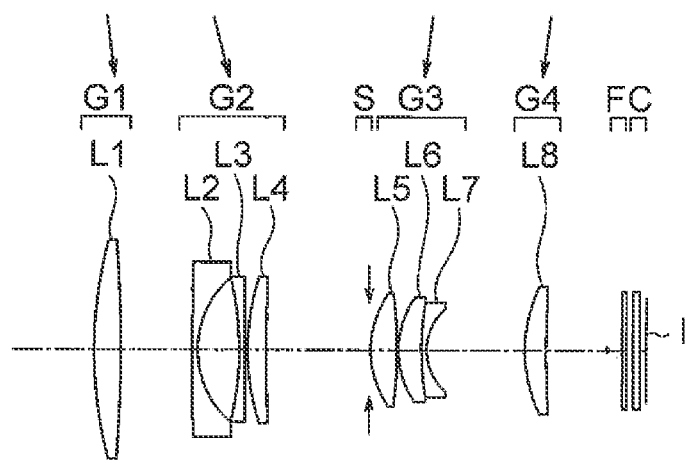
Figure 1C:
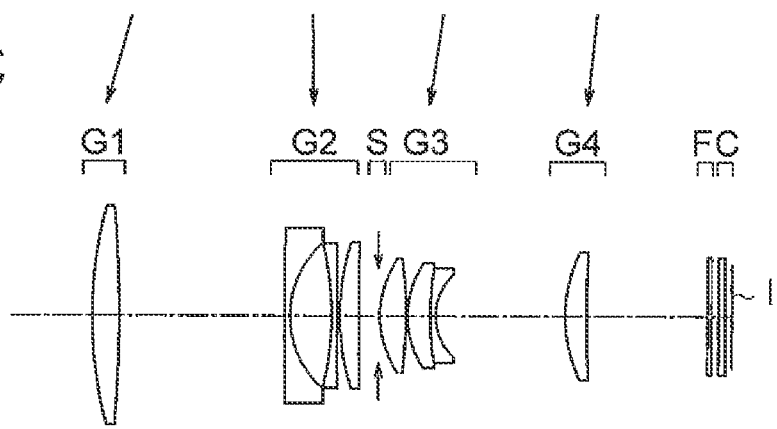

(B-3) Focusing may be carried out by drawing the overall lens system, or by drawing out or by drawing in some of the lens units. A zoom lens according to the first embodiment of the present invention, as shown in FIG. 1A, FIG. 1B, and FIG. 1C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At the time of zooming from a wide angle end to a telephoto end, the first lens unit G1, after moving toward an image side, moves toward an object side. The second lens unit G2 moves toward the image side. The third lens unit G3 moves toward the object side. The fourth lens unit G4 moves toward the object side. In order from the object side, the first lens unit G1 includes a biconvex positive lens L1. The second lens unit G2 includes a negative meniscus lens L2 having a convex surface directed toward the object side, a biconcave negative lens L3, and a positive meniscus lens L4 having a convex surface directed toward the object side. The third lens unit G3 includes a biconvex positive lens L5, and a cemented lens of a positive meniscus lens L6 having a convex surface directed toward the object side and a negative meniscus lens L7 having a convex surface directed toward the object side. The fourth lens unit G4 includes a positive meniscus lens L8 having a convex surface directed toward the object side.

An aspheric surface is provided to three surfaces namely, both surfaces of the biconvex positive lens L5, and a surface on the object side of the positive meniscus lens L8.

Figure 2A:
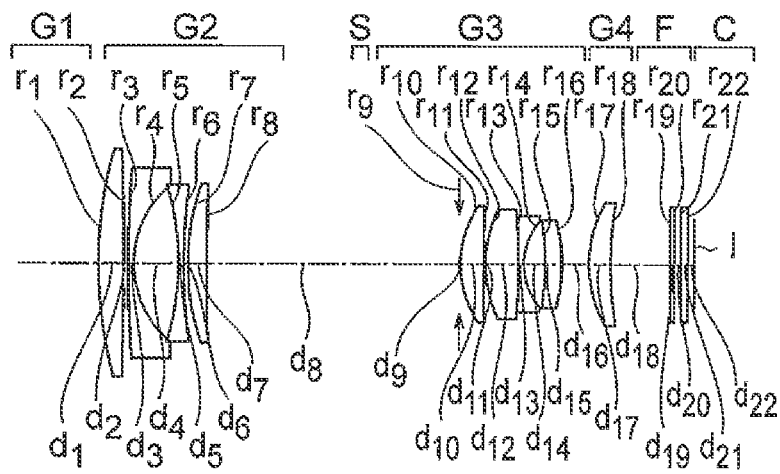
FIG. 2A, FIG. 2B, and FIG. 2C are cross-sectional views along an optical axis showing an arrangement at the time of infinite object point focusing of a zoom lens according to a second embodiment of the present invention, where.
Figure 2B:
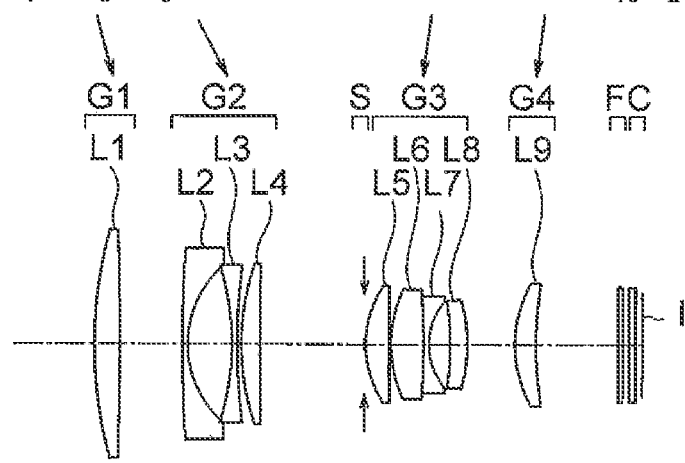
Figure 2C:
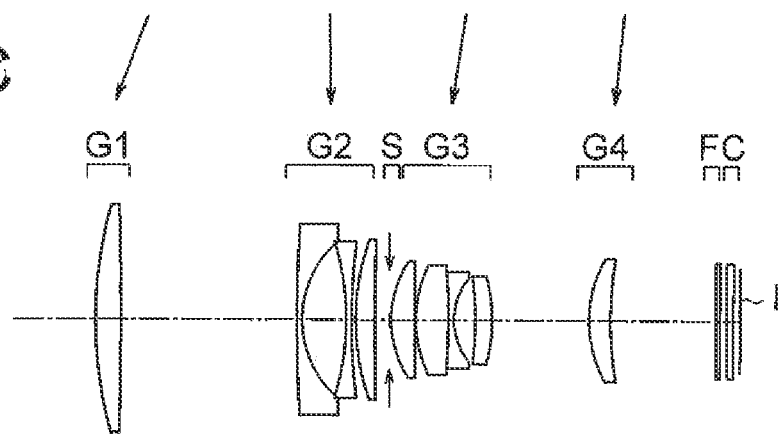

A zoom lens according to the second embodiment, as shown in FIG. 2A, FIG. 2B, and FIG. 2C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power. At the time of zooming from a wide angle end to a telephoto end, the first lens unit G1, after moving toward an image side, moves toward the object side. The second lens unit G2 moves toward the image side. The third lens unit G3 moves toward the object side. Fourth lens unit G4 moves toward the object side. In order from the object side, the first lens unit G1 includes a biconvex positive lens L1. The second lens unit G2 includes a negative meniscus lens L2 having a convex surface directed toward the object side, a biconcave negative lens L3, and a positive meniscus lens L4 having a convex surface directed toward the object side. The third lens unit G3 includes a biconvex positive lens L5, a cemented lens of a biconvex positive lens 6 and a biconcave negative lens L7, and a positive meniscus lens L8 having a convex surface directed toward the image side. The fourth lens unit G4 includes a positive meniscus lens L9 having a convex surface directed toward the object side.

An aspheric surface is provided to four surfaces namely, both surfaces of the biconvex positive lens L5, a surface on the image side of the positive meniscus lens L8, and a surface on the object side of the positive meniscus lens L9.

Figure 3A:
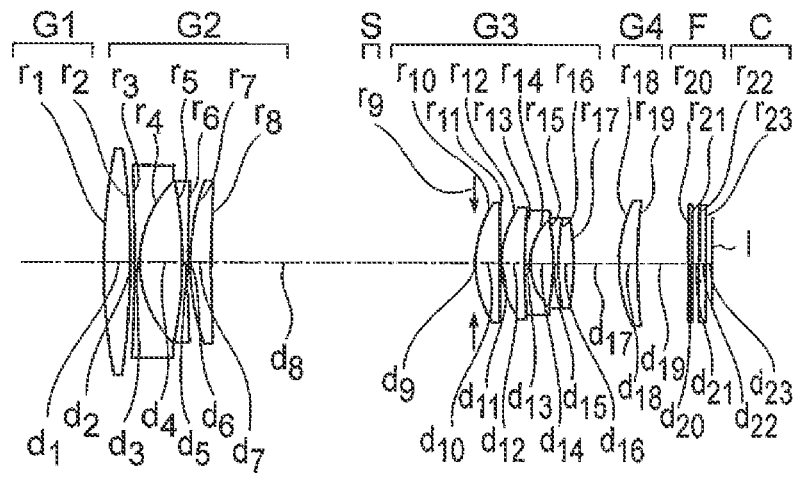
FIG. 3A, FIG. 3B, and FIG. 3C are cross-sectional views along an optical axis showing an arrangement at the time of infinite object point focusing of a zoom lens according to a third embodiment of the present invention, where.
Figure 3B:
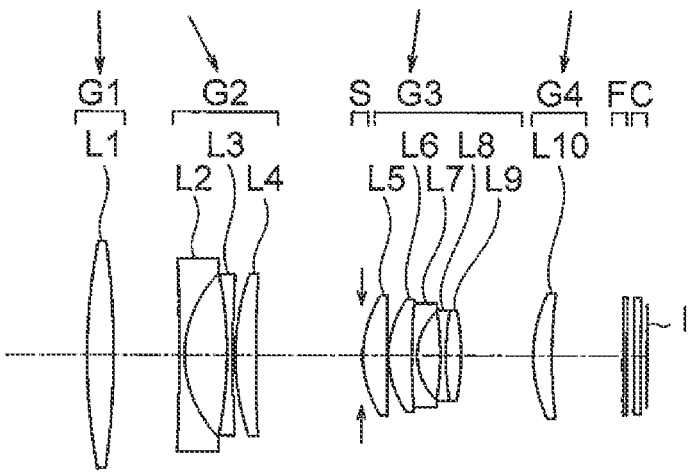
Figure 3C:
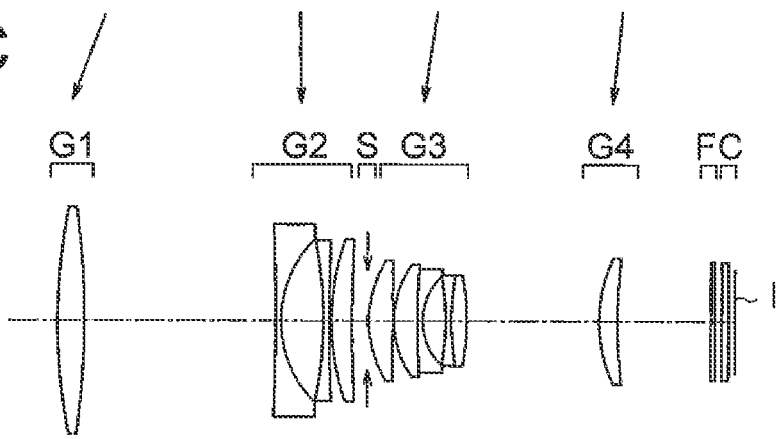

A zoom lens according to the third embodiment, as shown in FIG. 3A, FIG. 3B, and FIG. 3C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power. At the time of zooming from a wide angle end to a telephoto end, the first lens unit G1, after moving toward an image side, moves toward the object side. The second lens unit G2 moves toward the image side. The third lens unit G3 moves toward the object side. The fourth lens unit G4 moves toward the object side. In order from the object side, the first lens unit G1 includes a biconvex positive lens L1. The second lens unit G2 includes a biconcave negative lens L2, a biconcave negative lens L3, and a positive meniscus lens L4 having a convex surface directed toward the object side. The third lens unit G3 includes a positive meniscus lens L5 having a convex surface directed toward the object side, a cemented lens of a positive meniscus lens L6 having a convex surface directed toward the object side and a negative meniscus lens L7 having a convex surface directed toward the object side, and a cemented lens of a biconcave negative lens L8 and a biconvex positive lens L9. The fourth lens unit G4 includes a positive meniscus lens L10 having a convex surface directed toward the object side.

An aspheric surface is provided to four surfaces namely, both surfaces of the positive meniscus lens L5, a surface on the image side of the biconvex positive lens L9, and a surface on the object side of the positive meniscus lens L10.

Figure 4A:
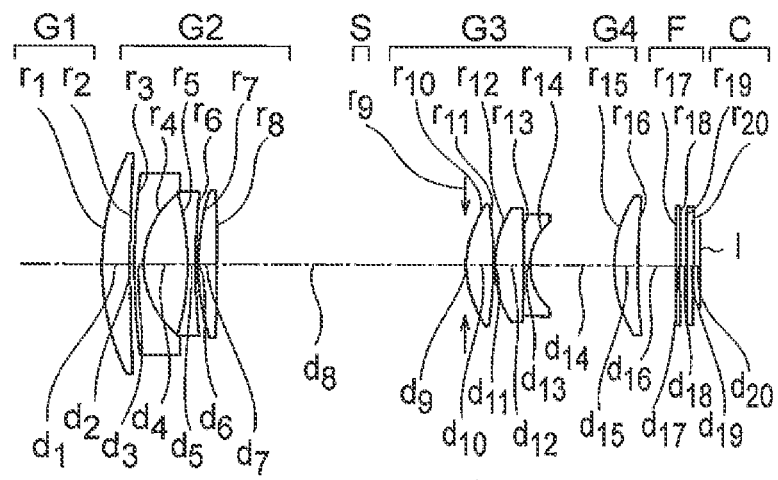
FIG. 4A, FIG. 4B, and FIG. 4C are cross-sectional views along an optical axis showing an arrangement at the time of infinite object point focusing of a zoom lens according to a fourth embodiment of the present invention, where.
Figure 4B:
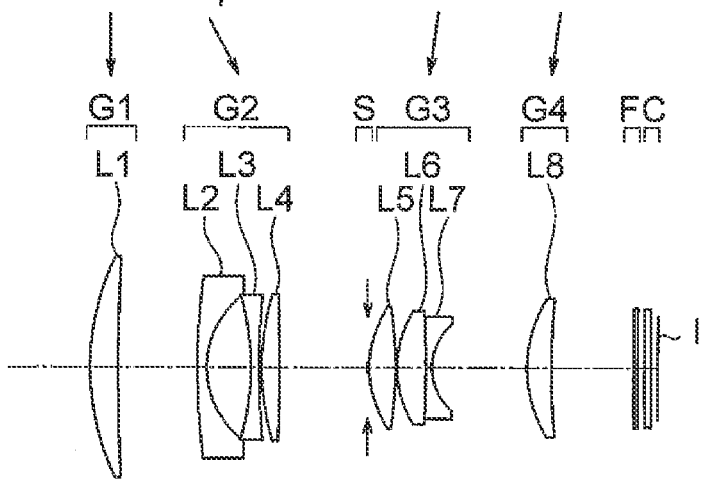
Figure 4C:
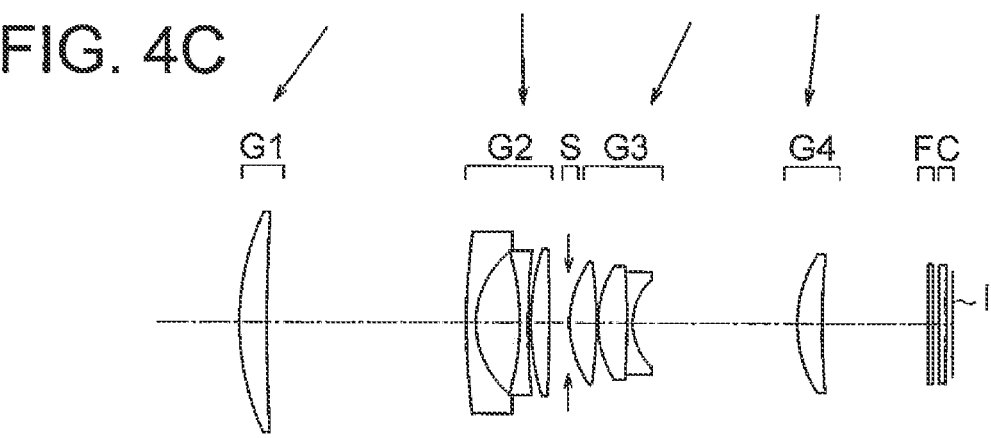

A zoom lens according to the fourth embodiment, as shown in FIG. 4A, FIG. 4B, and FIG. 4C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power. At the time of zooming from a wide angle end to a telephoto end, the first lens unit Gb, after moving toward an image side, moves toward the object side. The second lens unit G2, after moving toward the image side, moves toward the object side. The third lens unit G3 moves toward the object side. The fourth lens unit G4 moves toward the object side.

In order from the object side, the first lens unit G1 includes a positive meniscus lens L1 having a convex surface directed toward the object side. The second lens unit G2 includes a negative meniscus lens L2 having a convex surface directed toward the object side, a biconcave negative lens L3, and a biconvex positive lens L4. The third lens unit G3 includes a biconvex positive lens L5, and a cemented lens of a biconvex positive lens L6 and a biconcave negative lens L7. The fourth lens unit G4 includes a positive meniscus lens L8 having a convex surface directed toward the object side.

An aspheric surface is provided to three surfaces namely, both surfaces of the biconvex positive lens L5 and a surface on the object side of the positive meniscus lens L8.

Figure 5A:
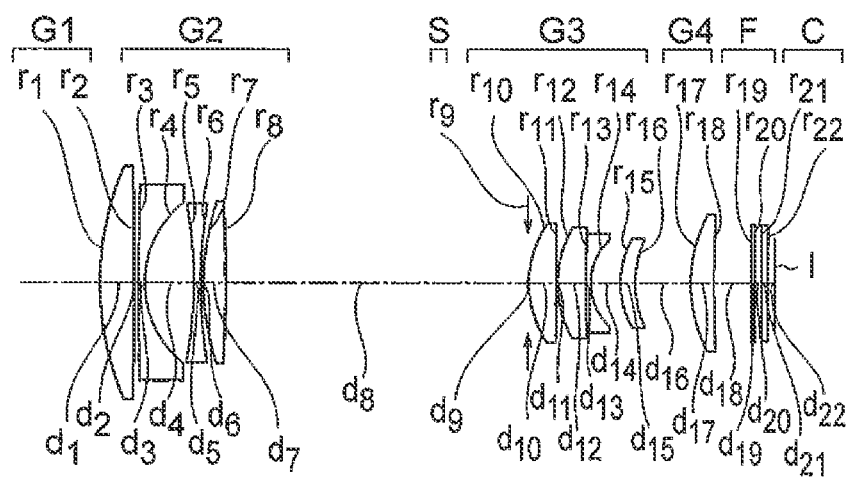
FIG. 5A, FIG. 5B, and FIG. 5C are cross-sectional views along an optical axis showing an arrangement at the time of infinite object point focusing of a zoom lens according to a fifth embodiment of the present invention, where.
Figure 5B:
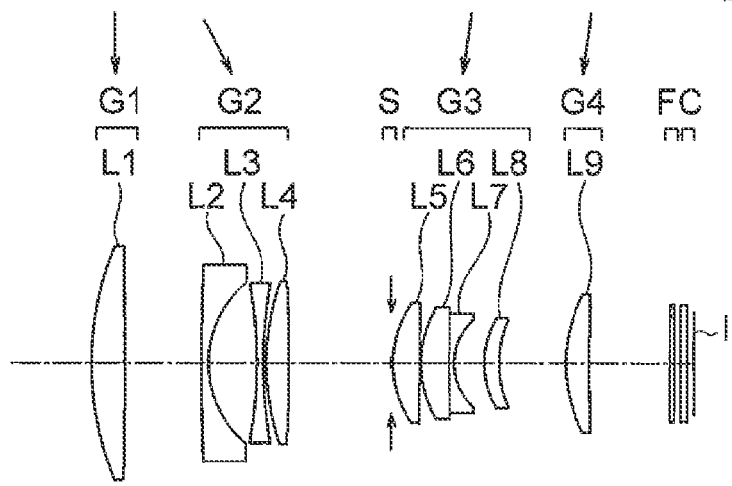
Figure 5C:
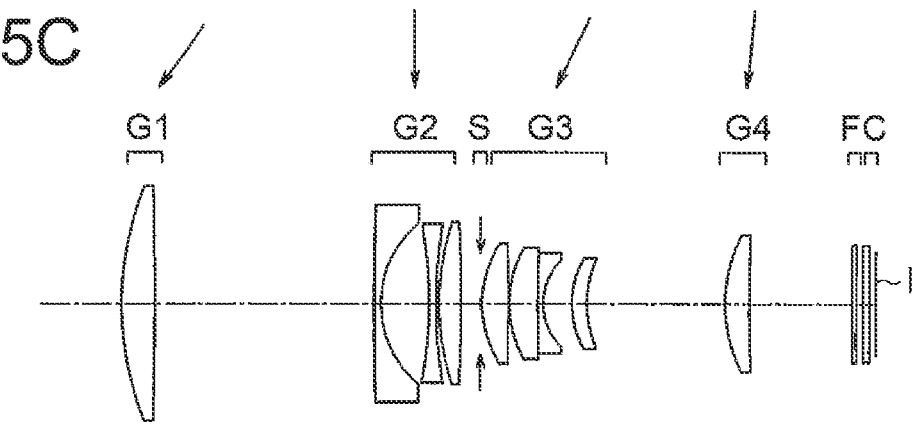

A zoom lens according to the fifth embodiment, as shown in FIG. 5A, FIG. 5B, and FIG. 5C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power. At the time of zooming from a wide angle end to a telephoto end, the first lens unit G1, after moving toward an image side, moves toward the object side. The second lens unit G2, after moving toward the image side, moves toward the object side. The third lens unit G3 moves toward the object side. The fourth lens unit G4 moves toward the object side.

In order from the object side, the first lens unit G1 includes a biconvex positive lens L1. The second lens unit G2 includes a negative meniscus lens L2 having a convex surface directed toward the object side, a biconcave negative lens L3, and a biconvex positive lens L4. The third lens unit G3 includes a biconvex positive lens L5, a cemented lens of a positive meniscus lens L6 having a convex surface directed toward the object side and a negative meniscus lens L7 having a convex surface directed toward the object side, and a positive meniscus lens L8 having a convex surface directed toward the object side. The fourth lens unit G4 includes a positive meniscus lens L9 having a convex surface directed toward the object side.

An aspheric surface is provided to six surfaces namely, both surfaces of the biconcave negative lens L3, both surfaces of the positive meniscus lens L5, a surface on the image side of the positive meniscus lens L8, and a surface on the object side of the positive meniscus lens L9.

Figure 6A:
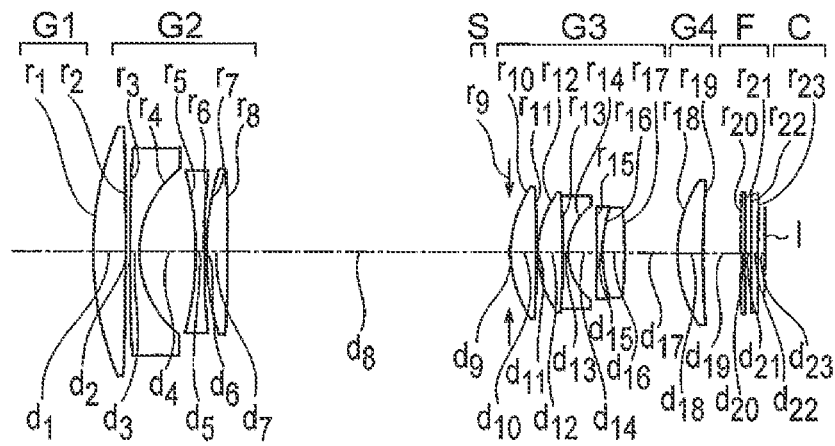
FIG. 6A, FIG. 6B, and FIG. 6C are cross-sectional views along an optical axis showing arrangement at the time of infinite object point focusing of a zoom lens according to a sixth embodiment of the present invention, where.
Figure 6B:
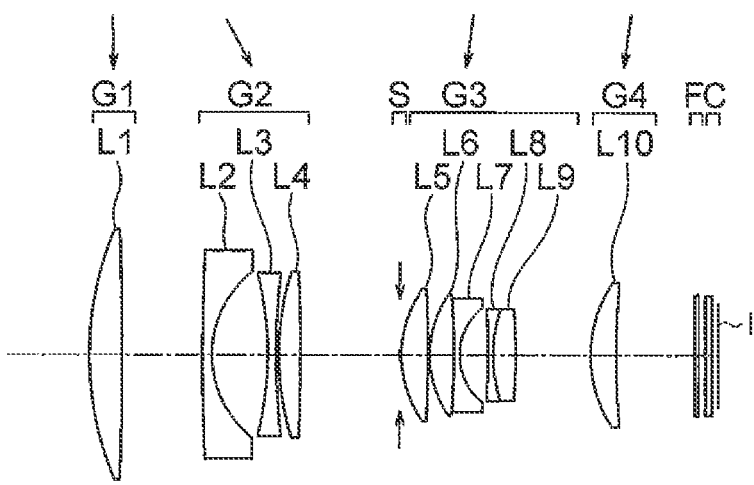
Figure 6C:
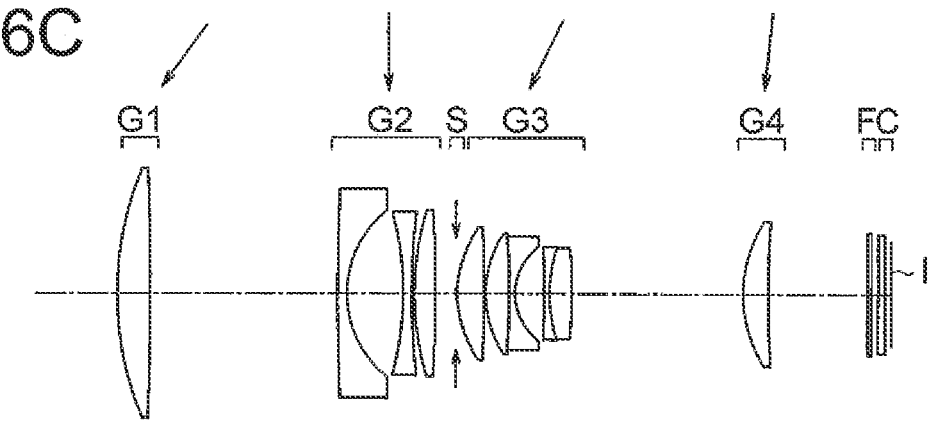

A zoom lens according to a sixth embodiment, as shown in FIG. 6A, FIG. 6B, and FIG. 6C, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power. At the time of zooming from a wide angle end to a telephoto end, the first lens unit G1, after moving toward an image side, moves toward the object side. The second lens unit G2, after moving toward the image side, moves toward the object side. The third lens unit G3 moves toward the object side. The fourth lens unit G4 moves toward the object side.

In order from the object side, the first lens unit G1 includes a biconvex positive lens L1. The second lens unit G2 includes a negative meniscus lens L2 having a convex surface directed toward the object side, a biconcave negative lens L3, and a biconvex positive lens L4. The third lens unit G3 includes a biconvex positive lens L5, a cemented lens of a biconvex positive lens L6 and a biconcave negative lens L7, and a cemented lens of a biconcave negative lens L8 and a biconvex positive lens L9. The fourth lens unit G4 includes a positive meniscus lens L10 having a convex surface directed toward the object side.

An aspheric surface is provided to four surfaces namely, both surfaces of the biconvex positive lens L5, a surface on the image side of the biconvex positive lens L9, and a surface on the object side of the positive meniscus lens L10.

Numerical data of each embodiment described above is shown below. Apart from symbols described above, BF denotes a back focus, f1, f2, ... denotes a focal length of each lens unit, FNO denotes an F number, ω denotes a half image angle, WE denotes a wide angle end, ST denotes an intermediate state, TE denotes a telephoto end, r denotes radius of curvature of each lens surface, d denotes a distance between two lenses, nd denotes a refractive index of each lens for a d-line, and vd denotes an Abbe's number for each lens. The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

A shape of the aspheric surface is described by the following expression (I) using each aspherical surface coefficient in each embodiment, when Z is let to be a coordinate point on an optical axis, and Y is let to be a coordinate point on a direction orthogonal to the optical axis.

$$Z=(Y^2/r)/[1+\{1-(1+k)(Y/r)^2\}^{1/2}]+A_4Y^4+A_6Y^6+A_8Y^8+A_{10}Y^{10}+A_{12}Y^{12} \quad (I)$$

where, r denotes a paraxial radius of curvature, k denotes a conical coefficient, $A_4, A_6, A_8, A_{10},$ and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Example 1

Unit mm

Surface data

| Surface no. | r | d | nd | vd |
|---|---|---|---|---|
| Object plane | ∞ | ∞ | | |
| 1 | 32.135 | 2.00 | 1.49700 | 81.54 |
| 2 | −102.316 | Variable | | |
| 3 | 328.385 | 0.40 | 1.88300 | 40.76 |
| 4 | 7.290 | 3.10 | | |
| 5 | −22.607 | 0.40 | 1.88300 | 40.76 |
| 6 | 833.870 | 0.20 | | |
| 7 | 17.699 | 1.45 | 1.92286 | 18.90 |
| 8 | 307.224 | Variable | | |
| 9(stop) | ∞ | 0.10 | | |
| 10* | 6.919 | 1.99 | 1.58313 | 59.38 |
| 11* | −28.825 | 0.10 | | |
| 12 | 7.122 | 1.70 | 1.88300 | 40.76 |
| 13 | 21.541 | 0.40 | 1.80810 | 22.76 |
| 14 | 4.206 | Variable | | |
| 15* | 10.426 | 1.60 | 1.52542 | 55.78 |
| 16 | 90.000 | Variable | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.50 | | |
| Image plane (Image pickup surface) | ∞ | | | |

Aspherical surface data

10th surface

K = 0.000
A4 = −3.56614e−04, A6 = −2.66751e−07, A8 = −2.38109e−07
11th surface

K = 0.000
A4 = 1.04332e−04, A6 = 1.85779e−06, A8 = −1.38006e−07

-continued

Unit mm

15th surface

K = 0.000
A4 = −1.67784e−04, A6 = 7.36083e−07, A8 = 2.38133e−08

Zoom data

| | Wide angle | Intermediate | Telephoto |
|---|---|---|---|
| Focal length | 5.06 | 9.82 | 19.43 |
| Fno. | 2.04 | 2.46 | 3.06 |
| Angle of field 2ω | 76.16 | 43.39 | 22.23 |
| fb (in air) | 4.76 | 7.15 | 10.50 |
| Lens total length (in air) | 43.08 | 40.81 | 47.33 |
| d2 | 0.30 | 5.30 | 12.29 |
| d8 | 18.49 | 7.68 | 1.44 |
| d14 | 6.09 | 7.23 | 9.66 |
| d16 | 3.23 | 5.63 | 8.97 |

Unit focal length

| f1 = 49.45 | f2 = −9.73 | f3 = 11.71 | f4 = 22.29 |

Example 2

Unit mm

Surface data

| Surface no. | r | d | nd | vd |
|---|---|---|---|---|
| Object plane | ∞ | ∞ | | |
| 1 | 32.677 | 1.86 | 1.59282 | 68.63 |
| 2 | −273.418 | Variable | | |
| 3 | 110.799 | 0.40 | 1.91082 | 35.25 |
| 4 | 7.794 | 3.32 | | |
| 5 | −19.599 | 0.40 | 1.56732 | 42.82 |
| 6 | 47.981 | 0.30 | | |
| 7 | 18.215 | 1.42 | 1.94595 | 17.98 |
| 8 | 255.190 | Variable | | |
| 9(stop) | ∞ | 0.10 | | |
| 10* | 7.622 | 1.76 | 1.74320 | 49.29 |
| 11* | −502.038 | 0.10 | | |
| 12 | 9.543 | 2.41 | 1.83481 | 42.71 |
| 13 | −55.013 | 0.40 | 1.84666 | 23.78 |
| 14 | 4.926 | 1.60 | | |
| 15 | −24.221 | 1.25 | 1.69350 | 53.21 |
| 16* | −12.469 | Variable | | |
| 17* | 9.243 | 1.58 | 1.52542 | 55.78 |
| 18 | 28.000 | Variable | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.50 | | |
| Image plane (Image pickup surface) | ∞ | | | |

Aspherical surface data

10th surface

K = 0.000
A4 = −1.62944e−04, A6 = −2.85442e−06, A8 = −9.83142e−08
11th surface

K = 0.000
A4 = 1.52229e−04, A6 = −4.19409e−06
16th surface

K = 0.000
A4 = −1.83930e−05, A6 = 3.87170e−06

-continued

Unit mm

17th surface

K = 0.000
A4 = −9.80740e−05, A6 = 7.73598e−07

Zoom data

|  | Wide angle | Intermediate | Telephoto |
|---|---|---|---|
| Focal length | 5.05 | 9.42 | 19.49 |
| Fno. | 1.85 | 2.20 | 2.73 |
| Angle of field 2ω | 76.03 | 45.76 | 22.43 |
| fb (in air) | 5.99 | 7.65 | 9.40 |
| Lens total length (in air) | 44.03 | 40.51 | 47.73 |
| d2 | 0.35 | 4.70 | 13.13 |
| d8 | 18.80 | 7.73 | 1.10 |
| d16 | 1.99 | 3.52 | 7.19 |
| d18 | 4.46 | 6.13 | 7.88 |

Unit focal length

| f1 = 49.35 | f2 = −10.55 | f3 = 12.27 | f4 = 25.52 |
|---|---|---|---|

Example 3

Unit mm

Surface data

| Surface no. | r | d | nd | νd |
|---|---|---|---|---|
| Object plane | ∞ | ∞ | | |
| 1 | 45.610 | 1.98 | 1.43700 | 95.10 |
| 2 | −62.539 | Variable | | |
| 3 | −177.607 | 0.40 | 1.88300 | 40.76 |
| 4 | 8.662 | 3.16 | | |
| 5 | −30.819 | 0.40 | 1.72916 | 54.68 |
| 6 | 106.371 | 0.19 | | |
| 7 | 18.181 | 1.57 | 1.92286 | 18.90 |
| 8 | 107.134 | Variable | | |
| 9(stop) | ∞ | 0.10 | | |
| 10* | 8.164 | 1.80 | 1.74320 | 49.29 |
| 11* | 2266.058 | 0.10 | | |
| 12 | 7.396 | 1.74 | 1.88300 | 40.76 |
| 13 | 52.632 | 0.40 | 1.84666 | 23.78 |
| 14 | 4.647 | 1.70 | | |
| 15 | −19.473 | 0.40 | 1.60342 | 38.03 |
| 16 | 20.125 | 1.15 | 1.74320 | 49.29 |
| 17* | −17.070 | Variable | | |
| 18* | 10.632 | 1.38 | 1.52542 | 55.78 |
| 19 | 38.861 | Variable | | |
| 20 | ∞ | 0.30 | 1.51633 | 64.14 |
| 21 | ∞ | 0.50 | | |
| 22 | ∞ | 0.50 | 1.51633 | 64.14 |
| 23 | ∞ | 0.50 | | |
| Image plane (Image pickup surface) | ∞ | | | |

Aspherical surface data

10th surface

K = 0.000
A4 = −1.37600e−04, A6 = −2.97778e−06, A8 = −3.44388e−08

11th surface

K = 0.000
A4 = 7.33111e−05, A6 = −2.67414e−06

17th surface

K = 0.000
A4 = 8.08396e−05, A6 = 8.15239e−07

-continued

Unit mm

18th surface

K = 0.000
A4 = −9.67408e−05, A6 = −7.54455e−07, A8 = 2.45503e−08

Zoom data

|  | Wide angle | Intermediate | Telephoto |
|---|---|---|---|
| Focal length | 5.05 | 9.50 | 19.49 |
| Fno. | 1.85 | 2.22 | 2.82 |
| Angle of field 2ω | 77.56 | 45.15 | 21.99 |
| fb (in air) | 5.34 | 6.84 | 8.50 |
| Lens total length (in air) | 45.02 | 41.43 | 50.20 |
| d2 | 0.30 | 4.91 | 14.26 |
| d8 | 19.58 | 7.86 | 1.15 |
| d17 | 3.33 | 5.35 | 9.82 |
| d19 | 3.82 | 5.31 | 6.97 |

Unit focal length

| f1 = 60.69 | f2 = −11.16 | f3 = 12.03 | f4 = 27.40 |
|---|---|---|---|

Example 4

Unit mm

Surface data

| Surface no. | r | d | nd | νd |
|---|---|---|---|---|
| Object plane | ∞ | ∞ | | |
| 1 | 19.317 | 2.07 | 1.49700 | 81.61 |
| 2 | 136.730 | Variable | | |
| 3 | 51.381 | 0.70 | 1.91082 | 35.25 |
| 4 | 6.845 | 3.28 | | |
| 5 | −19.045 | 0.60 | 1.81600 | 46.62 |
| 6 | 52.685 | 0.20 | | |
| 7 | 18.317 | 1.39 | 1.92286 | 18.90 |
| 8 | −132.373 | Variable | | |
| 9(stop) | ∞ | 0.10 | | |
| 10* | 7.433 | 1.99 | 1.58313 | 59.38 |
| 11* | −26.249 | 0.10 | | |
| 12 | 8.035 | 2.16 | 1.91082 | 35.25 |
| 13 | −75.166 | 0.45 | 1.80810 | 22.76 |
| 14 | 4.371 | Variable | | |
| 15* | 9.500 | 1.80 | 1.52542 | 55.78 |
| 16 | 50.374 | Variable | | |
| 17 | ∞ | 0.30 | 1.51633 | 64.14 |
| 18 | ∞ | 0.50 | | |
| 19 | ∞ | 0.50 | 1.51633 | 64.14 |
| 20 | ∞ | 0.50 | | |
| Image plane Image pickup surface) | ∞ | | | |

Aspherical surface data

10th surface

K = 0.000
A4 = −3.28470e−04, A6 = −1.80647e−06, A8 = −5.88729e−08

11th surface

K = 0.000
A4 = 1.06190e−04, A6 = 1.88197e−08

15th surface

K = 0.000
A4 = −1.19691e−04, A6 = 1.16742e−06

-continued

| Unit mm | | | |
|---|---|---|---|
| Zoom data | | | |
| | Wide angle | Intermediate | Telephoto |
| Focal length | 5.03 | 11.00 | 24.14 |
| Fno. | 1.93 | 2.39 | 3.02 |
| Angle of field 2ω | 76.60 | 39.97 | 18.39 |
| fb (in air) | 4.33 | 7.65 | 9.42 |
| Lens total length (in air) | 44.16 | 41.96 | 52.78 |
| d2 | 0.30 | 5.92 | 14.81 |
| d8 | 18.53 | 6.56 | 1.45 |
| d14 | 6.16 | 6.99 | 12.26 |
| d16 | 2.80 | 6.12 | 7.90 |

| Unit focal length | | | |
|---|---|---|---|
| f1 = 45.00 | f2 = −9.04 | f3 = 11.56 | f4 = 21.95 |

Example 5

| Unit mm | | | | |
|---|---|---|---|---|
| Surface data | | | | |
| Surface no. | r | d | nd | νd |
| Object plane | ∞ | ∞ | | |
| 1 | 23.558 | 2.52 | 1.43700 | 95.10 |
| 2 | −350.000 | Variable | | |
| 3 | 227.639 | 0.50 | 1.88300 | 40.76 |
| 4 | 7.929 | 3.69 | | |
| 5* | −28.111 | 0.50 | 1.88300 | 40.76 |
| 6* | 42.109 | 0.20 | | |
| 7 | 18.962 | 1.70 | 1.92286 | 20.88 |
| 8 | −110.652 | Variable | | |
| 9(stop) | ∞ | 0.10 | | |
| 10* | 7.986 | 2.00 | 1.74320 | 49.34 |
| 11* | −688.203 | 0.10 | | |
| 12 | 8.665 | 2.10 | 1.88300 | 40.76 |
| 13 | 103.576 | 0.40 | 1.84666 | 23.78 |
| 14 | 4.659 | 2.20 | | |
| 15 | 7.000 | 1.10 | 1.49700 | 81.61 |
| 16* | 8.673 | Variable | | |
| 17* | 10.874 | 1.80 | 1.52542 | 55.78 |
| 18 | 138.834 | Variable | | |
| 19 | ∞ | 0.30 | 1.51633 | 64.14 |
| 20 | ∞ | 0.50 | | |
| 21 | ∞ | 0.50 | 1.51633 | 64.14 |
| 22 | ∞ | 0.50 | | |
| Image plane (Image pickup surface) | ∞ | | | |

Aspherical surface data

5th surface

K = 0.000
A4 = 8.99939e−05, A6 = −7.31309e−07
6th surface

K = 0.000
A4 = 8.66142e−05, A6 = −1.37660e−06
10th surface

K = 0.000
A4 = −1.61669e−04, A6 = −1.88985e−06, A8 = −3.85013e−08
11th surface

K = 0.000
A4 = 2.30075e−05, A6 = −3.97947e−07

-continued

| Unit mm |
|---|
| 16th surface |

K = 0.000
A4 = 2.17691e−04, A6 = 7.02441e−06, A8 = −3.73778e−07
17th surface

K = 0.000
A4 = −1.14736e−04, A6 = 4.29259e−07

| Zoom data | | | |
|---|---|---|---|
| | Wide angle | Intermediate | Telephoto |
| Focal length | 5.04 | 10.88 | 24.45 |
| Fno. | 2.04 | 2.47 | 3.11 |
| Angle of field 2ω | 76.49 | 40.05 | 17.79 |
| fb (in air) | 4.32 | 7.65 | 9.36 |
| Lens total length (in air) | 50.43 | 45.09 | 56.53 |
| d2 | 0.30 | 5.80 | 16.48 |
| d8 | 22.73 | 7.74 | 1.45 |
| d16 | 4.18 | 4.99 | 10.33 |
| d18 | 2.80 | 6.12 | 7.83 |

| Unit focal length | | | |
|---|---|---|---|
| f1 = 50.61 | f2 = −10.35 | f3 = 12.69 | f4 = 22.35 |

Example 6

| Unit mm | | | | |
|---|---|---|---|---|
| Surface data | | | | |
| Surface no. | r | d | nd | νd |
| Object plane | ∞ | ∞ | | |
| 1 | 24.393 | 2.45 | 1.49700 | 81.54 |
| 2 | −260.106 | Variable | | |
| 3 | 171.127 | 0.70 | 1.88300 | 40.76 |
| 4 | 7.982 | 4.20 | | |
| 5 | −23.380 | 0.60 | 1.88300 | 40.76 |
| 6 | 53.250 | 0.20 | | |
| 7 | 21.441 | 1.60 | 1.92286 | 18.90 |
| 8 | −120.476 | Variable | | |
| 9(stop) | ∞ | 0.10 | | |
| 10* | 8.120 | 1.98 | 1.74320 | 49.34 |
| 11* | −84.847 | 0.10 | | |
| 12 | 7.946 | 1.82 | 1.83552 | 42.11 |
| 13 | −57.655 | 0.40 | 1.78570 | 25.12 |
| 14 | 4.500 | 2.14 | | |
| 15 | −72.226 | 0.40 | 1.52923 | 58.47 |
| 16 | 11.144 | 1.66 | 1.49700 | 81.54 |
| 17* | −44.832 | Variable | | |
| 18* | 9.721 | 1.90 | 1.52542 | 55.78 |
| 19 | 70.000 | Variable | | |
| 20 | ∞ | 0.30 | 1.51633 | 64.14 |
| 21 | ∞ | 0.50 | | |
| 22 | ∞ | 0.50 | 1.51633 | 64.14 |
| 23 | ∞ | 0.50 | | |
| Image plane (Image pickup surface) | ∞ | | | |

Aspherical surface data

10th surface

K = 0.000
A4 = −2.15147e−04, A6 = −1.00465e−06, A8 = −6.50613e−08
11th surface

K = 0.000
A4 = 2.98737e−05, A6 = 2.46489e−07, A8 = −2.74588e−08

-continued

Unit mm

17th surface

K = 0.000
A4 = −4.17923e−07, A6 = 7.01812e−06, A8 = −7.78124e−07
18th surface

K = 0.000
A4 = −7.09682e−05, A6 = 3.90578e−07, A8 = −1.09170e−08

Zoom data

|  | Wide angle | Intermediate | Telephoto |
| --- | --- | --- | --- |
| Focal length | 5.01 | 10.97 | 24.04 |
| Fno. | 1.84 | 2.25 | 2.99 |
| Angle of field 2ω | 77.03 | 39.77 | 18.36 |
| fb (in air) | 4.39 | 7.38 | 8.94 |
| Lens total length (in air) | 49.75 | 46.60 | 57.43 |
| d2 | 0.30 | 6.00 | 13.97 |
| d8 | 20.88 | 7.38 | 1.55 |
| d17 | 3.94 | 5.59 | 12.72 |
| d19 | 2.86 | 5.86 | 7.42 |

Unit focal length

| f1 = 45.00 | f2 = −9.42 | f3 = 12.70 | f4 = 21.25 |
| --- | --- | --- | --- |

Aberration diagrams at the time of infinite object point focusing of the embodiments from the first embodiment to the sixth embodiment are shown in diagrams from FIG. 7A to FIG. 7L, FIG. 8A to FIG. 8L, FIG. 9A to FIG. 9L, FIG. 10A to FIG. 10L, FIG. 11A to FIG. 11L, and FIG. 12A to FIG. 12L. In each of the aberration diagrams, 'ω' denotes a half angle of field.

FIG. 7A to FIG. 7L are aberration diagrams at the time of infinite object point focusing in the first embodiment, where, FIG. 7A, FIG. 7B, FIG. 7C, and FIG. 7D indicate spherical aberration (SA), astigmatism (AS), distortion (DT), and chromatic aberration of magnification (CC) in a wide angle end state, FIG. 7E, FIG. 7F, FIG. 7G, and FIG. 7H indicate spherical aberration, astigmatism, distortion, and chromatic aberration of magnification in an intermediate focal length state, and FIG. 7I, FIG. 7J, FIG. 7K, and FIG. 7L indicate spherical aberration, astigmatism, distortion, and chromatic aberration of magnification in a telephoto end state.

FIG. 8A to FIG. 8L are aberration diagrams at the time of infinite object point focusing in the second embodiment, where, FIG. 8A, FIG. 8B, FIG. 8C, and FIG. 8D indicate spherical aberration, astigmatism, distortion, and chromatic aberration of magnification in a wide angle end state, FIG. 8E, FIG. 8F, FIG. 8G, and FIG. 8H indicate spherical aberration, astigmatism, distortion, and chromatic aberration of magnification in an intermediate focal length state, and FIG. 8I, FIG. 8J, FIG. 8K, and FIG. 8L indicate spherical aberration, astigmatism, distortion, and chromatic aberration of magnification in a telephoto end state.

FIG. 9A to FIG. 9L are aberration diagrams at the time of infinite object point focusing in the third embodiment, where, FIG. 9A, FIG. 9B, FIG. 9C, and FIG. 9D indicate spherical aberration, astigmatism, distortion, and chromatic aberration of magnification in a wide angle end state, FIG. 9E, FIG. 9F, FIG. 9G, and FIG. 9H indicate spherical aberration, astigmatism, distortion, and chromatic aberration of magnification in an intermediate focal length state, and FIG. 9I, FIG. 9J, FIG. 9K, and FIG. 9L indicate spherical aberration, astigmatism, distortion, and chromatic aberration of magnification in a telephoto end state.

FIG. 10A to FIG. 10L are aberration diagrams at the time of infinite object point focusing in the fourth embodiment, where, FIG. 10A, FIG. 10B, FIG. 10C, and FIG. 10D indicate spherical aberration, astigmatism, distortion, and chromatic aberration of magnification in a wide angle end state, FIG. 10E, FIG. 10F, FIG. 10G, and FIG. 10H indicate spherical aberration, astigmatism, distortion, and chromatic aberration of magnification in an intermediate focal length state, and FIG. 10I, FIG. 10J, FIG. 10K, and FIG. 10L indicate spherical aberration, astigmatism, distortion, and chromatic aberration of magnification in a telephoto end state.

FIG. 11A to FIG. 11L are aberration diagrams at the time of infinite object point focusing in the fifth embodiment, where, FIG. 11A, FIG. 11B, FIG. 11C, and FIG. 11D indicate spherical aberration, astigmatism, distortion, and chromatic aberration of magnification in a wide angle end state, FIG. 11E, FIG. 11F, FIG. 11G, and FIG. 11H indicate spherical aberration, astigmatism, distortion, and chromatic aberration of magnification in an intermediate focal length state, and FIG. 11I, FIG. 11J, FIG. 11K, and FIG. 11L indicate spherical aberration, astigmatism, distortion, and chromatic aberration of magnification in a telephoto end state.

FIG. 12A to FIG. 12L are aberration diagrams at the time of infinite object point focusing in the sixth embodiment, where, FIG. 12A, FIG. 12B, FIG. 12C, and FIG. 12D indicate spherical aberration, astigmatism, distortion, and chromatic aberration of magnification in a wide angle end state, FIG. 12E, FIG. 12F, FIG. 12G, and FIG. 12H indicate spherical aberration, astigmatism, distortion, and chromatic aberration of magnification in an intermediate focal length state, and FIG. 12I, FIG. 12J, FIG. 12K, and FIG. 12L indicate spherical aberration, astigmatism, distortion, and chromatic aberration of magnification in a telephoto end state.

Next, parameter and values of conditional expressions in each embodiments are described.

| | Conditional expressions | Example 1 | Example 2 | Example 3 |
| --- | --- | --- | --- | --- |
| (1) | Fno(W) | 2.04 | 1.85 | 1.85 |
| (2) | ft/fw | 3.84 | 3.86 | 3.86 |
| (3) | Σd1G/ft | 0.10 | 0.10 | 0.10 |
| (4) | Σd1G/Σd3G | 0.48 | 0.25 | 0.27 |
| (5) | f3/fw | 2.31 | 2.43 | 2.38 |
| (6) | L/I | 0.52 | 0.48 | 0.51 |
| (7), (7a) | vd_1G | 81.54 | 68.63 | 95.10 |
| (8), (8a), (8b), (8c) | (β2t/β2w)/(β3t/β3w) | 0.36 | 0.48 | 0.43 |
| (9) | (β4t/β4w)/(β3t/β3w) | 0.16 | 0.26 | 0.26 |
| (10) | (β3t/β3w)/(ft/fw) | 1.06 | 0.82 | 0.84 |
| (11) | (Δ1G/f1)/(Δ4G/f4) | 0.33 | 0.56 | 0.74 |
| (12) | β3t/β3w | 4.08 | 3.15 | 3.25 |
| (13) | Fno(T) | 3.06 | 2.73 | 2.82 |
| (14) | Lt/ft | 2.44 | 2.45 | 2.58 |
| (15) | β4(T) | 0.48 | 0.57 | 0.65 |
| (16) | f1/ft | 2.54 | 2.53 | 3.11 |
| (17) | f2/f3 | −0.83 | −0.86 | −0.93 |
| (18) | f3/ft | 0.60 | 0.63 | 0.62 |
| (19) | f2/ft | −0.50 | −0.54 | −0.57 |
| (20) | |f_3G1/f_3G2| | 0.44 | 0.62 | 0.43 |
| (21) | |f_3G2-p/f_3G2-n| | 1.75 | 1.86 | 1.58 |
| (22) | (nd_3G2-p) − (nd_3G2-n) | 0.07 | −0.01 | 0.04 |

| | Conditional expressions | Example 4 | Example 5 | Example 6 |
| --- | --- | --- | --- | --- |
| (1) | Fno(W) | 1.93 | 2.04 | 1.84 |
| (2) | ft/fw | 4.80 | 4.85 | 4.80 |
| (3) | Σd1G/ft | 0.09 | 0.10 | 0.10 |

-continued

| | Conditional expressions | Example 4 | Example 5 | Example 6 |
|---|---|---|---|---|
| (4) | $\Sigma d1G/\Sigma d3G$ | 0.44 | 0.32 | 0.29 |
| (5) | f3/fw | 2.30 | 2.52 | 2.54 |
| (6) | L/I | 0.54 | 0.65 | 0.63 |
| (7), (7a) | vd__1G | 81.61 | 95.10 | 81.54 |
| (8), (8a), (8b), (8c) | $(\beta 2t/\beta 2w)/(\beta 3t/\beta 3w)$ | 0.44 | 0.43 | 0.42 |
| (9) | $(\beta 4t/\beta 4w)/(\beta 3t/\beta 3w)$ | 0.17 | 0.17 | 0.17 |
| (10) | $(\beta 3t/\beta 3w)/(ft/fw)$ | 0.84 | 0.83 | 0.84 |
| (11) | $(\Delta 1G/f1)/(\Delta 4G/f4)$ | 0.82 | 0.53 | 0.80 |
| (12) | $\beta 3t/\beta 3w$ | 4.01 | 4.02 | 4.04 |
| (13) | Fno(T) | 3.02 | 3.11 | 2.99 |
| (14) | Lt/ft | 2.19 | 2.31 | 2.39 |
| (15) | $\beta 4(T)$ | 0.51 | 0.52 | 0.51 |
| (16) | f1/ft | 1.86 | 2.07 | 1.87 |
| (17) | f2/f3 | −0.78 | −0.82 | −0.74 |
| (18) | f3/ft | 0.48 | 0.52 | 0.53 |
| (19) | f2/ft | −0.37 | −0.42 | −0.39 |
| (20) | |f_3G1/f_3G2| | 0.42 | 0.59 | 0.47 |
| (21) | |f_3G2-p/f_3G2-n| | 1.58 | 1.84 | 1.60 |
| (22) | (nd__3G2-p) − (nd__3G2-n) | 0.10 | 0.04 | 0.05 |

Figure 13:
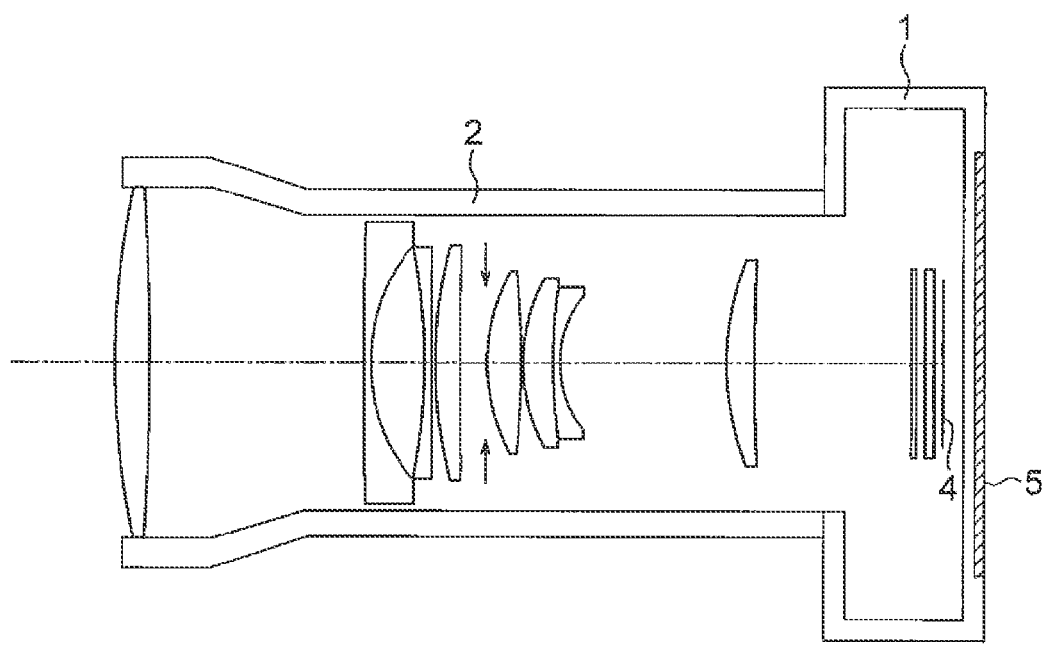
FIG. 13 is a cross-sectional view of a compact camera as an image pickup apparatus in which a small-size CCD or CMOS has been used as an image pickup element, using the zoom lens according to the present invention.

FIG. 13 is a cross-sectional view of a compact camera 1 as an image pickup apparatus in which, the zoom lens according to the present invention is used, and a small-size CCD (charge coupled device) or a CMOS (complementary metal oxide semiconductor) is used. An image pickup lens system 2 is disposed inside a lens barrel of the compact camera 1, and an image pickup element surface 4, and aback monitor 5 are disposed inside a (camera) body.

Here, it is also possible to let the image pickup lens system 2 to be detachable from a single-lens mirrorless camera by providing a mounting portion to the lens barrel. As the mounting portion, for example, a screw type mount or a bayonet type mount could be used.

The zoom lens described in the embodiments from the first embodiment to the sixth embodiment is to be used as the image pickup lens system 2 of the compact camera 1 having such structure.

Figure 14:
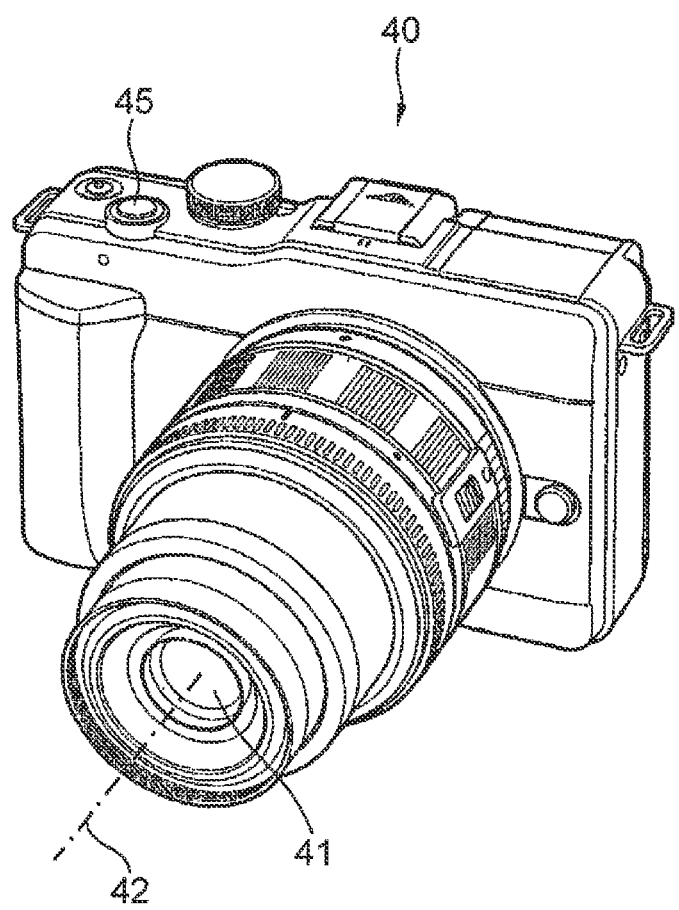
FIG. 14 is a front perspective view showing an appearance of a digital camera as an image pickup apparatus.
Figure 15:
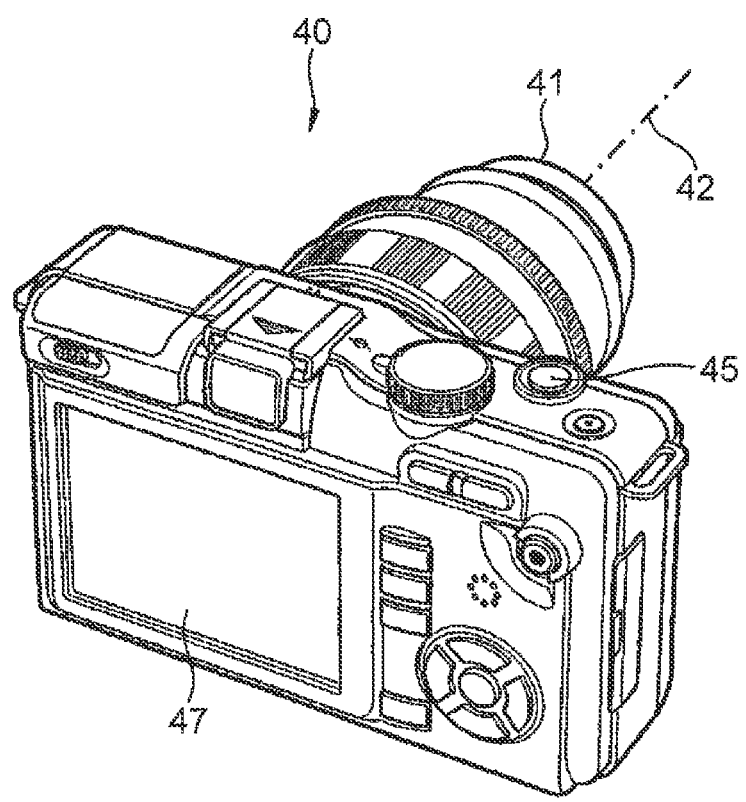
FIG. 15 is a rear perspective view showing an appearance of a digital camera as an image pickup apparatus.

FIG. 14 and FIG. 15 show conceptual diagrams of a structure of the image pickup apparatus according to the present invention in which, the zoom lens has been incorporated in a photographic optical system 41. FIG. 14 is a front perspective view showing an appearance of a digital camera 40 as an image pickup apparatus, and FIG. 15 is a rear perspective view showing an appearance of the digital camera 40.

The digital camera 40 according to the embodiment includes the photographic optical system 41 positioned on a capturing optical path 42, a shutter button 45, and a liquid-crystal display monitor 47. When the shutter button 45 disposed on an upper portion of the digital camera 40 is pressed, in conjunction with the pressing of the shutter button 45, an image is captured through the photographic optical system 41 such as the zoom lens according to the first embodiment. An object image which has been formed by the photographic optical system 41 is formed on an image pickup element (photoelectric conversion surface) provided near an image forming surface. The object image which has been received by the image pickup element is displayed as an electronic image on the liquid-crystal display monitor 47 provided on a rear surface of the digital camera 40 by a processing unit 51. Moreover, it is possible to record the electronic image which has been captured in a recording unit.
(Internal Circuit Structure)

Figure 16:
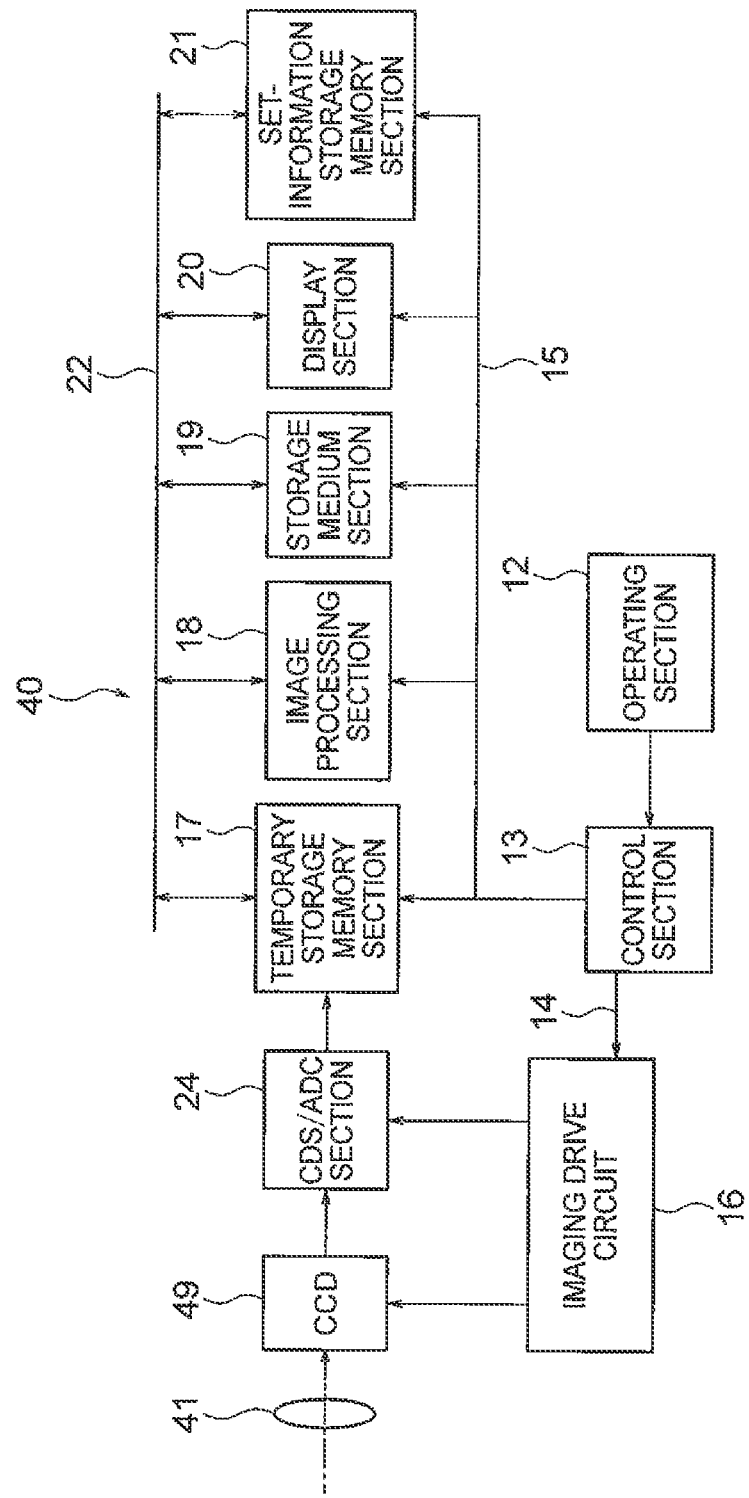
FIG. 16 is a block diagram showing an internal circuit of main sections of the digital camera.

FIG. 16 is a block diagram showing an internal circuit of main components of the digital camera 40. In the following description, the processing unit mentioned above includes components such as CDS/ADC section 24, a temporary storage memory section 17, and an image processing section 18. A storage unit includes a storage medium As shown in FIG. 16, the digital camera 40 includes an operating section 12, a control section 13 which is connected to the operating section 12, an imaging drive circuit 16 which is connected to a control-signal output port of the control section 13 via buses 14 and 15, the temporary storage memory section 17, the image processing section 18, a storage medium section 19, a display section 20, and a set-information storage memory section 21.

The temporary storage memory section 17, the image processing section 18, the storage medium section 19, the display section 20, and the set-information storage memory section 21 are capable of inputting and outputting data mutually via a bus 22. Moreover, a CCD 49 and the CDS/ADC section 24 are connected to the imaging drive circuit 16.

The operating section 12 includes various input buttons and switches, and imparts event information input from outside (user of camera) via the input buttons and switches to the control section 13. The control section 13 is a central arithmetic processing unit such as a CPU with a built-in program memory which is not shown in the diagram, and controls the overall digital camera according to a computer program which has been stored in the computer program memory.

The CCD 49 is an image pickup element which is driven and controlled by the imaging drive circuit 16, and which converts an amount of light for each pixel of the object image which has been formed through the image pickup optical system 41 to an electric signal, and outputs to the CDS/ADC section 24.

The CDS/ADC section 24 is a circuit which amplifies the electric signal input from the CCD 49, and also carries out analog-to-digital conversion, and outputs image raw-data only for the amplification and digital conversion carried out (bayer data, hereinafter called as 'RAW data').

The temporary storage memory section 17 is a buffer such as a SDRAM, and is a memory unit which temporarily stores the RAW data output put from the CDS/ADC section 24. The image processing section 18 is a circuit which reads the RAW data which has been stored in the temporary storage memory section 17 or the RAW data which has been stored in the storage medium section 19, and carries out electrically, various image processing including a distortion correction based on image-quality parameters which have been specified by the control section 13.

The recording medium section 19 in which, a recording medium in the form of a stick or a card with a flash memory is detachably mounted, records and maintains the RAW data which is transferred from the temporary storage memory section 17 and image data which has been subjected to image processing in the image processing section 18.

The display section 20 includes the liquid-crystal display monitor 47 and displays operation menu, image data, and RAW data captured. The set-information storage memory section 21 is provided with a ROM section in which various image-quality parameters are stored in advance, and a RAM section which stores the image-quality parameters which have been read from the ROM section by an input and output operation of the operating section 12.

The digital camera 40 which is structured in such manner, by adopting the zoom lens according to the present invention as the photographic optical system 41, enables zooming, and enables setting of a first mode which enables focusing including up to infinity and a second mode in which it is possible to achieve substantial (high) magnification, thereby making it possible to let to be an image pickup apparatus which is advantageous for both small-sizing and improved performance.

As it has been described above, the zoom lens according to the present invention is useful in a case of small-sizing while being a zoom lens which has a high zooming.

The zoom lens according to the present invention shows an effect that it is possible to have zoom lens having a compact structure by suppressing the lens diameter from becoming excessively large, while being a zoom lens which has a large aperture diameter and a high zooming.

What is claimed is:

1. A zoom lens comprising in order from an object side:
a first lens unit having a positive refractive power;
a second lens unit having a negative refractive power;
a third lens unit having a positive refractive power; and
a fourth lens unit having a positive refractive power,
wherein
the zoom lens satisfies the following conditional expressions (3), (4), (5), and (6)

$$\Sigma d_{1G}/f_t < 0.13 \tag{3}$$

$$\Sigma d_{1G}/\Sigma d_{3G} < 0.5 \tag{4}$$

$$2.1 < f_3/f_w \tag{5}$$

$$0.2 < L/I \tag{6}$$

where,
$\Sigma d_{1G}$ denotes a sum total of an optical axial thickness of the first lens unit,
$f_t$ denotes a focal length at a telephoto end of the overall zoom lens system,
$\Sigma d_{3G}$ denotes a sum total of an optical axial thickness of the third lens unit,
$f_3$ denotes a focal length of the third lens unit,
$f_w$ denotes a focal length at a wide angle end of the overall zoom lens system,
L denotes an optical axial thickness of optical members which form the first lens unit, and
I denotes a maximum image height at the wide angle end of the overall zoom lens system.

2. A zoom lens comprising in order from an object side:
a first lens unit having a positive refractive power;
a second lens unit having a negative refractive power;
a third lens unit having a positive refractive power; and
a fourth lens unit having a positive refractive power,
wherein
the first lens unit consists one positive lens, and
the zoom lens satisfies the following conditional expressions (7) and (8)

$$65 < v_{d\_1G} \tag{7}$$

$$0.1 < (\beta_{2t}/\beta_{2w})/(\beta_{3t}/\beta_{3w}) < 0.483 \tag{8}$$

where,
$v_{d_{1G}}$ denotes Abbe's number $(n_{d1}-1)/(n_{F1}-n_{C1})$ for a d-line of the first lens unit,
$n_{d1}$ denotes a refractive index for the d-line of the first lens unit,
$n_{F1}$ denotes a refractive index for an F-line of the first lens unit,
$n_{C1}$ denotes a refractive index for a C-line of the first lens unit,
$\beta_{2t}$ denotes a lateral magnification at a telephoto end of the second lens unit
$\beta_{2w}$ denotes a lateral magnification at a wide angle end of the second lens unit,
$\beta_{3t}$ denotes a lateral magnification at the telephoto end of the third lens unit, and
$\beta_{3w}$ denotes a lateral magnification at the wide angle end of the third lens unit.

3. A zoom lens comprising in order from an object side:
a first lens unit having a positive refractive power;
a second lens unit having a negative refractive power;
a third lens unit having a positive refractive power; and
a fourth lens unit having a positive refractive power,
wherein
the first lens unit consists one positive lens, and
the zoom lens satisfies the following conditional expressions (7a) and (8a)

$$71 < v_{d_{1G}} \tag{7a}$$

$$0.1 < (\beta_{2t}/\beta_{2w})/(\beta_{3t}/(\beta_{3w}) < 0.6 \tag{8a}$$

where,
$v_{d_{1G}}$ denotes Abbe's number $(n_{d1}-1)/(n_{F1}-n_{C1})$ for a d-line of the first lens unit,
$n_{d1}$ denotes a refractive index for the d-line of the first lens unit,
$n_{F1}$ denotes a refractive index for an F-line of the first lens unit,
$n_{C1}$ denotes a refractive index for a C-line of the first lens unit,
$\beta_{2t}$ denotes a lateral magnification at a telephoto end of the second lens unit
$\beta_{2w}$ denotes a lateral magnification at a wide angle end of the second lens unit,
$\beta_{3t}$ denotes a lateral magnification at the telephoto end of the third lens unit, and
$\beta_{3w}$ denotes a lateral magnification at the wide angle end of the third lens unit.

4. A zoom lens comprising in order from an object side:
a first lens unit having a positive refractive power;
a second lens unit having a negative refractive power;
a third lens unit having a positive refractive power; and
a fourth lens unit having a positive refractive power,
wherein
the first lens unit consists one positive lens, and
the zoom lens satisfies the following conditional expressions (7) and (9)

$$65 < v_{d_{1G}} \tag{7}$$

$$0.05 < (\beta_{4t}/\beta_{4w})/(\beta_{3t}/\beta_{3w}) < 0.27 \tag{9}$$

where,
$v_{d_{1G}}$ denotes Abbe's number $(n_{d1}-1)/(n_{F1}-n_{C1})$ for a d-line of the first lens unit,
$n_{d1}$ denotes a refractive index for the d-line of the first lens unit,
$n_{F1}$ denotes a refractive index for an F-line of the first lens unit,
$n_{C1}$ denotes a refractive index for a C-line of the first lens unit,
$\beta_{4t}$ denotes a lateral magnification at a telephoto end of the fourth lens unit
$\beta_{4w}$ denotes a lateral magnification at a wide angle end of the fourth lens unit,
$\beta_{3t}$ denotes a lateral magnification at the telephoto end of the third lens unit, and
$\beta_{3w}$ denotes a lateral magnification at the wide angle end of the third lens unit.

5. A zoom lens comprising in order from an object side:
a first lens unit having a positive refractive power;
a second lens unit having a negative refractive power;

a third lens unit having a positive refractive power; and
a fourth lens unit having a positive refractive power,
wherein
the first lens unit consists one positive lens, and
the third lens unit comprises not less than three lenses, and
the zoom lens satisfies the following conditional expressions (7a) and (8b)

$$71 < v_{d_{1G}} \quad (7a)$$

$$0.1 < (\beta_{2t}/\beta_{2w})/(\beta_{3t}/\beta_{3w}) < 0.65 \quad (8b)$$

where,
$v_{d_{1G}}$ denotes Abbe's number $(n_{d1}-1)/(n_{F1}-n_{C1})$ for a d-line of the first lens unit,
$n_{d1}$ denotes a refractive index for the d-line of the first lens unit,
$n_{F1}$ denotes a refractive index for an F-line of the first lens unit,
$n_{C1}$ denotes a refractive index for a C-line of the first lens unit,
$\beta_{2t}$ denotes a lateral magnification at a telephoto end of the second lens unit
$\beta_{2w}$ denotes a lateral magnification at a wide angle end of the second lens unit,
$\beta_{3t}$ denotes a lateral magnification at the telephoto end of the third lens unit, and
$\beta_{3w}$ denotes a lateral magnification at the wide angle end of the third lens unit.

6. A zoom lens comprising in order from an object side:
a first lens unit having a positive refractive power;
a second lens unit having a negative refractive power;
a third lens unit having a positive refractive power; and
a fourth lens unit having a positive refractive power,
wherein
the first lens unit consists one positive lens, and
the zoom lens satisfies the following conditional expressions (7a), (8c), and (10)

$$71 < v_{d_{1G}} \quad (7a)$$

$$0.1 < (\beta_{2t}/\beta_{2w})/(\beta_{3t}/\beta_{3w}) < 0.62 \quad (8c)$$

$$0.7 < (\beta_{3t}/\beta_{3w})/(f_t/f_w) < 1.1 \quad (10)$$

where,
$v_{d_{1G}}$ denotes Abbe's number $(n_{d1}-1)/(n_{F1}-n_{C1})$ for a d-line of the first lens unit,
$n_{d1}$ denotes a refractive index for the d-line of the first lens unit,
$n_{F1}$ denotes a refractive index for an F-line of the first lens unit,
$n_{C1}$ denotes a refractive index for a C-line of the first lens unit,
$\beta_{2t}$ denotes a lateral magnification at a telephoto end of the second lens unit
$\beta_{2w}$ denotes a lateral magnification at a wide angle end of the second lens unit,
$\beta_{3t}$ denotes a lateral magnification at the telephoto end of the third lens unit,
$\beta_{3w}$ denotes a lateral magnification at the wide angle end of the third lens unit,
$f_t$ denotes a focal length at the telephoto end of the overall zoom lens system, and
$f_w$ denotes a focal length at the wide angle end of the overall zoom lens system.

7. A zoom lens comprising in order from an object side:
a first lens unit having a positive refractive power;
a second lens unit having a negative refractive power;
a third lens unit having a positive refractive power; and
a fourth lens unit having a positive refractive power,
wherein
the first lens unit consists one positive lens, and
at the time of zooming from a wide angle end to a telephoto end, the fourth lens unit moves toward the object side, and
the zoom lens satisfies the following conditional expressions (7a), (10), and (11)

$$71 < v_{d_{1G}} \quad (7a)$$

$$0.7 < (\beta_{3t}/\beta_{3w})/(f_t/f_w) < 1.1 \quad (10)$$

$$0.1 < (\Delta_{1G}/f_1)/(\Delta_{4G}/f_4) < 1.9 \quad (11)$$

where,
$v_{d_{1G}}$ denotes Abbe's number $(n_{d1}-1)/(n_{F1}-n_{C1})$ for a d-line of the first lens unit,
$n_{d1}$ denotes a refractive index for the d-line of the first lens unit,
$n_{F1}$ denotes a refractive index for an F-line of the first lens unit,
$n_{C1}$ denotes a refractive index for a C-line of the first lens unit,
$\beta_{3t}$ denotes a lateral magnification at the telephoto end of the third lens unit,
$\beta_{3w}$ denotes a lateral magnification at the wide angle end of the third lens unit,
$f_t$ denotes a focal length at the telephoto end of the overall zoom lens system,
$f_w$ denotes a focal length at the wide angle end of the overall zoom lens system,
$f_4$ denotes a focal length of the fourth lens unit,
$\Delta_{4G}$ denotes an amount of movement of the fourth lens unit at the telephoto end with respect to the wide angle end,
$f_1$ denotes a focal length of the first lens unit, and
$\Delta_{1G}$ denotes an amount of movement of the first lens unit at the telephoto end with respect to the wide angle end.

8. A zoom lens comprising in order from an object side:
a first lens unit having a positive refractive power;
a second lens unit having a negative refractive power;
a third lens unit having a positive refractive power; and
a fourth lens unit having a positive refractive power,
wherein
the first lens unit consists one positive lens, and
the zoom lens satisfies the following conditional expressions (7) and (12)

$$65 < v_{d_{1G}} \quad (7)$$

$$3 < \beta_{3t}/\beta_{3w} \quad (12)$$

where,
$v_{d_{1G}}$ denotes Abbe's number $(n_{d1}-1)/(n_{F1}-n_{C1})$ for a d-line of the first lens unit,
$n_{d1}$ denotes a refractive index for the d-line of the first lens unit,
$n_{F1}$ denotes a refractive index for an F-line of the first lens unit,
$n_{C1}$ denotes a refractive index for a C-line of the first lens unit,
$\beta_{3t}$ denotes a lateral magnification at a telephoto end of the third lens unit, and
$\beta_{3w}$ denotes a lateral magnification at the wide angle end of the third lens unit.

9. A zoom lens comprising in order from an object side:
a first lens unit having a positive refractive power, wherein
the first lens unit having a positive refractive power consists one positive lens, and
the zoom lens satisfies the following conditional expressions (1) and (2), $$Fno_{(W)}<2.7 \quad (1)$$

$$3.1<f_t/f_w \quad (2)$$

where
$Fno_{(W)}$ denotes an F-number of the zoom lens at a wide angle end,
$f_t$ denotes a focal length at a telephoto end of the overall zoom lens s stem and
$f_w$ denotes a focal length at the wide angle end of the overall zoom lens system;
and wherein the zoom lens satisfies the following conditional expression (13)

$$Fno_{(T)}<4.1 \quad (13)$$

where,
$Fno_{(T)}$ denotes an F-number of the zoom lens at a telephoto end.

10. The zoom lens according to claim 1, wherein the zoom lens satisfies the following conditional expression (9)

$$0.05<(\beta_{4t}/\beta_{4w})/(\beta_{3t}/\beta_{3w})<0.27 \quad (9)$$

where,
$\beta_{4t}$ denotes a lateral magnification at the telephoto end of the fourth lens unit
$\beta_{4w}$ denotes a lateral magnification at the wide angle end of the fourth lens unit,
$\beta_{3t}$ denotes a lateral magnification at the telephoto end of the third lens unit, and
$\beta_{3w}$ denotes a lateral magnification at the wide angle end of the third lens unit.

11. The zoom lens according to claim 1, wherein the zoom lens satisfies the following conditional expression (10)

$$0.7<(\beta_{3t}/\beta_{3w})/(f_t/f_w)<1.1 \quad (10)$$

where,
$\beta_{3t}$ denotes a lateral magnification at the telephoto end of the third lens unit,
$\beta_{3w}$ denotes a lateral magnification at the wide angle end of the third lens unit,
$f_t$ denotes the focal length at the telephoto end of the overall zoom lens system, and
$f_w$ denotes the focal length at the wide angle end of the overall zoom lens system.

12. The zoom lens according to claim 1, wherein
at the time of zooming from the wide angle end to the telephoto end, the fourth lens unit moves toward the object side, and
the zoom lens satisfies the following conditional expression (11)

$$0.1<(\Delta_{1G}/f_1)/(\Delta_{4G}/f_4)<1.9 \quad (11)$$

where,
$f_4$ denotes a focal length of the fourth lens unit,
$\Delta_{4G}$ denotes an amount of movement of the fourth lens unit at the telephoto end with respect to the wide angle end,
$f_1$ denotes a focal length of the first lens unit, and
$\Delta_{1G}$ denotes an amount of movement of the first lens unit at the telephoto end with respect to the wide angle end.

13. The zoom lens according to claim 1, wherein the zoom lens satisfies the following conditional expression (15)

$$\beta_{4(T)}<0.7 \quad (15)$$

where,
$\beta_{4(T)}$ denotes a lateral magnification at the telephoto end of the fourth lens unit.

14. The zoom lens according to claim 1, wherein at the time of zooming from the wide angle end to the telephoto end, an aperture stop moves integrally with the third lens unit.

15. The zoom lens according to claim 1, wherein the zoom lens satisfies the following conditional expression (17)

$$-1<f_2/f_3<-0.6 \quad (17)$$

where,
$f_2$ denotes a focal length of the second lens unit, and
$f_3$ denotes a focal length of the third lens unit.

16. The zoom lens according to claim 1, wherein the zoom lens satisfies the following conditional expression (18)

$$0.45<f_3/f_t<0.7 \quad (18)$$

where,
$f_3$ denotes the focal length of the third lens unit, and
$f_t$ denotes the focal length at the telephoto end of the overall zoom lens system.

17. The zoom lens according to claim 1, wherein the zoom lens satisfies the following conditional expression (18)

$$-0.6<f_2/f_t<-0.3 \quad (19)$$

where,
$f_2$ denotes a focal length of the second lens unit, and
$f_t$ denotes a focal length at the telephoto end of the overall zoom lens system.

18. The zoom lens according to claim 1, wherein
the third lens unit comprises in order from the object side, a first lens component having a positive refractive power and a second lens component having a negative refractive power, and
the zoom lens satisfies the following conditional expression (20)

$$0.1<|f_{\_3G1}/f_{\_3G2}|<0.63 \quad (20)$$

where,
$f_{\_3G1}$ denotes a focal length of the first lens component in the third lens unit, and
$f_{\_3G2}$ denotes a focal length of the second lens component in the third lens unit.

19. The zoom lens according to claim 18, wherein
the second lens component is a cemented lens of a positive lens and a negative lens, and
the zoom lens satisfies the following conditional expression (21)

$$1.4<|f_{\_3G2-p}/f_{\_3G2-n}|<1.9 \quad (21)$$

where,
$f_{\_3G2-p}$ denotes a focal length of the positive lens of the second lens component in the third lens unit, and
$f_{\_3G2-n}$ denotes a focal length of the negative lens of the second lens component in the third lens unit.

20. The zoom lens according to claim 19, wherein the zoom lens satisfies the following conditional expression (22)

$$-0.05 \leq (n_{d\_3G2-p})-(n_{d\_3G2-n}) \quad (22)$$

where,
$n_{d\_3G2-p}$ denotes a refractive index of the positive lens of the second lens component in the third lens unit, and
$n_{d\_3G2-n}$ denotes a refractive index of the negative lens of the second lens component in the third lens unit.

* * * * *